US012671341B2

(12) United States Patent　　　　　(10) Patent No.:　US 12,671,341 B2

Pedroso et al.　　　　　　　　　　　(45) Date of Patent:　Jun. 30, 2026

(54) THREE-LEVEL ZETA ASYMMETRICAL HALF-BRIDGE

(71) Applicant: Hamilton Sundstrand Corporation, Charlotte, NC (US)

(72) Inventors: Douglas Araujo Pedroso, Cork (IE); Ignacio Castro Álvarez, Gijón (ES)

(73) Assignee: Hamilton Sundstrand Corporation, Charlotte, NC (US)

( * ) Notice: Subject to any disclaimer, the term of this patent is extended or adjusted under 35 U.S.C. 154(b) by 173 days.

(21) Appl. No.: 18/394,286

(22) Filed: Dec. 22, 2023

(65) Prior Publication Data

US 2024/0275291 A1　　Aug. 15, 2024

(30) Foreign Application Priority Data

Feb. 14, 2023　(EP) ..................................... 23156581

(51) Int. Cl.
　　*H02M 3/335*　　　(2006.01)
　　*H02M 3/00*　　　(2006.01)

(52) U.S. Cl.
　　CPC ......... *H02M 3/33571* (2021.05); *H02M 3/01* (2021.05)

(58) Field of Classification Search
　　CPC ... H02M 3/01; H02M 3/33569–33576; H02M 3/33592
　　See application file for complete search history.

(56) References Cited

U.S. PATENT DOCUMENTS

| | | | | |
|---|---|---|---|---|
| 6,282,109 | B1 * | 8/2001 | Fraidlin | H02M 7/217 |
| | | | | 363/84 |
| 9,831,784 | B2 | 11/2017 | Luccato | |
| 11,025,172 | B2 | 6/2021 | Zhang et al. | |
| 2007/0008744 | A1 | 1/2007 | Heo et al. | |
| 2016/0211759 | A1 * | 7/2016 | Luccato | H05B 45/382 |
| 2021/0067045 | A1 | 3/2021 | Zhang et al. | |
| 2022/0021295 | A1 | 1/2022 | Castro et al. | |

FOREIGN PATENT DOCUMENTS

| | | | | |
|---|---|---|---|---|
| CN | 112865549 B | 2/2022 | | |
| EP | 2262088 A1 | 12/2010 | | |
| EP | 3916984 A1 * | 12/2021 | ........ | H02M 7/53871 |
| WO | 2020248472 A1 | 12/2020 | | |

OTHER PUBLICATIONS

J.-B. Lee, K.-B. Park, J.-K. Kim, H.-S. Youn and G.-W. Moon, "A New Center-Tapped Half-Bridge Zeta Converter With Small Transformer DC-Offset Current and Low Voltage Stress," in IEEE Transactions on Power Electronics, vol. 30, No. 12, pp. 6593-6603, Dec. 2015, doi: 10.1109/TPEL.2015.2390254. (Year: 2015).*

Agamy et al., "A Three-Level Resonant Single-Stage Power Factor Correction Converter: Analysis, Design, and Implementation," IEEE Transactions on Industrial Electronics, vol. 56, No. 6, Jun. 2009, 13 pages.

(Continued)

*Primary Examiner* — Crystal L Hammond
*Assistant Examiner* — Jennifer C Caulk

(57)　　　　　ABSTRACT

A three-level zeta asymmetrical half-bridge for converting a DC input voltage into a DC output voltage comprising an asymmetrical half-bridge, a resonant tank and a zeta converter.

20 Claims, 21 Drawing Sheets

(56)          References Cited

OTHER PUBLICATIONS

Arias et al., "Design of a Soft-Switching Asymmetrical Half-Bridge Converter as Second Stage of an LED Driver for Street Lighting Application," IEEE Transactions on Power Electronics, vol. 27, No. 3, Mar. 2012, 14 pages.

Arias et al., "Optimized Design of a High Input-Voltage-Ripple-Rejection Converter for LED Lighting," IEEE Transactions on Power Electronics, vol. 33, No. 6, Jun. 2018, 14 pages.

Chiu et al., "LED Backlight Driving System for Large-Scale LCD Panels," IEEE Transactions on Industrial Electronics, vol. 54, No. 5, Oct. 2007, 10 pages.

Coccia et al., "Wide input Voltage range Compensation in DC/DC Resonant Architectures for On-Board Traction Power Supplies," IEEE Xplore, Oct. 2007, 10 pages.

Gu et al., "Three-Level LLC Series Resonant DC/DC Converter," IEEE Transactions on Power Electronics, vol. 20, No. 4, Jul. 2005, 9 pages.

Wu et al., "Design Optimization for Asymmetrical ZVS-PWM Zeta Converter," IEEE Transactions on Aerospace and Electronic Systems, vol. 39, No. 2, Apr. 2003, 12 pages.

Extended European Search Report, of the European Patent Office, dated Jun. 7, 2023, in corresponding European Patent Application No. 23156581.3.

Liu Dong et al: "Zero-Voltage Switching PWM Strategy Based Capacitor Current-Balancing control for Half-Bridge Three-Level DC/DC Converter", IEEE Transactions on Power Electronics, Institute of Electrical and Electronics Engineers, USA, vol. 33 No. 1, Jan. 1, 2018 (Jan. 1, 2018), pp. 357-369, XP011662022, ISSN: 0885-8993, DOI: 10.1109/TPEL.2017.2659648 [retrieved on Oct. 6, 2017] * abstract *.

Bor-Ren Lin et al: "Soft-Switching Zeta-Flyback Converter With a Buck-Boost Type of Active Clamp", IEEE Transactions on Industrial Electronics, IEEE Services Center, Piscataway, NJ, USA, vol. 54, No. 5, Oct. 1, 2007 (Oct. 1, 2007), pp. 2813-2822, XP011191140, ISSN: 0278-0046, DOI: 10.1109/TIE.2007.901366 * figures 1(b), 1(c) *.

Murthy-Bellur D et al: "Two-transistor Zeta-flyback DC-DC converter with reduced transistor voltage stress", Electronic Letters, The Institution of Engineering and Technology, vol. 46, No. 10, May 13, 2010 (May 13, 2010), pp. 719-720, XP006035579, ISSN: 1350-911X, DOI: 10.1049/EL:20103494 * figure 2 *.

Masahito Shoyama et al: "Zero-Voltage-Switched Push-Pull DC-DC Converter" Proceedings Fo the Annual Power Electronics Specialists Conference. Massachusetts, Jun. 25-27, 1991; [Proceedings of the Annual Power Electronics Specialists Conference], New York, IEEE, US, vol. Conf. 22, Jun. 23, 1991 (Jun. 23, 1991), pp. 223-229, XP000278405, ISBN: 978-0-7803-0090-3 * figure 1 *.

Communication pursuant to Article 94(3) EPC dated Dec. 5, 2024 in connection with European Patent Application No. 23156581.3, 13 pages.

Zhu et al., "Three-level Switching Cell for Low Voltage/High-Current DC-DC Converters," Eighteenth Annual IEEE Applied Power Electronics Conference and Exposition, Feb. 2003, 5 pages.

* cited by examiner $t_2 \geq t > t_3$ $t_3 \geq t > t_4$ $t_4 \geq t > t_5$

200

$t_5 \geq t > T_s$

200

Mode 3

$t_4 \geq t > t_5$ $t_5 \geq t > t_6$ $t_8 \geq t > t_9$ $t_9 \geq t > t_{10}$

Mode 1

Mode 2

THREE-LEVEL ZETA ASYMMETRICAL HALF-BRIDGE

CROSS-REFERENCE TO RELATED APPLICATIONS

This application claims priority to and the benefit of European Patent Application No. 23156581.3, filed Feb. 14, 2023, the entire content of which is incorporated herein by reference.

TECHNICAL FIELD

This disclosure relates to multilevel series resonant DC to DC voltage converters, in particular to a three-level zeta asymmetrical half-bridge.

BACKGROUND

In various DC to DC voltage applications, it may be important to isolate the high voltage part of the circuit from the low voltage part of the circuit. In addition, there are often large variations in either the input or output voltage. Various topologies of existing DC to DC voltage converters require a high degree of complexity of control of the circuit and/or have complex input EMI filtering requirements. Furthermore, reducing the voltage stresses across components may allow smaller components to be used in many applications. It is an aim to reduce losses in DC to DC power conversion, to reduce cooling requirements of the circuit, and/or to prolong the lifetime of circuit components.

SUMMARY

When viewed from a first aspect, the present disclosure provides a three-level zeta asymmetrical half-bridge for converting a DC input voltage into a DC output voltage comprising: an asymmetrical half-bridge, comprising a first pair of switching elements, and a second pair of switching elements in series with the first pair of switching elements; wherein a first portion of the DC input voltage is applied in parallel with the first pair of switching elements, and a second portion of the DC input voltage is applied in parallel with the second pair of switching elements; a resonant tank in parallel with one switching element from each pair of switching elements, the resonant tank comprising a magnetising inductance of a primary winding of a transformer, a resonant inductance and a primary resonant capacitance; and a zeta converter connected to a secondary winding of the transformer; wherein each pair of switching elements is arranged to operate in a sequence to selectively connect and disconnect the resonant tank to the respective first or second portion of the DC input voltage, such that a voltage of the resonant tank alternates between a low voltage and a high voltage; and wherein the resonant tank is arranged to filter out a DC component of the voltage of the resonant tank and output a filtered resonant tank voltage to the primary winding of the transformer; and wherein the zeta converter is arranged to rectify the output of the secondary winding of the transformer to output the DC output voltage.

A two-level half-bridge may be defined as a circuit in which two switches are connected in series with a power supply. Alternately switching on one switch and off the other switch applies the power supply voltage across the open, i.e. off, switch. Switching on and off each switch alternately applies the power supply voltage across each switch. An asymmetrical half-bridge may be defined as two switches connected in series with a power supply, wherein the load on each switch, i.e. in parallel with each switch, is not equal, i.e. not symmetric.

A three-level asymmetrical half bridge may be defined as two two-level asymmetrical half-bridges in series with each other, wherein a load is applied across the outputs of one of the two switches of each two-level asymmetrical half-bridge. By applying either no voltage across the load, the voltage of one of the two power supplies, or the voltage of both power supplies, the voltage across the load may be varied between three voltage levels.

A resonant tank may be defined as a circuit made up of at least one inductor, and at least one capacitor, that resonates at a specific frequency, called the resonant frequency.

A zeta converter may be defined as an DC-DC voltage converter. A traditional zeta converter has an input voltage applied across an inductor, wherein the inductor is in series with a capacitor, and wherein the output of the capacitor is in series with two parallel branches. The first branch comprises a diode arranged to only allow the flow of current toward the capacitor, and the second branch comprising an inductor and a second capacitor in series. A load is applied across, i.e. in parallel, with the second capacitor.

Use of a transformer in the three-level zeta asymmetrical half-bridge provides galvanic isolation between the input and output of the circuit.

A three-level zeta asymmetrical half-bridge may be defined as a three-level asymmetrical half bridge which outputs to a resonant tank, comprising the first winding of a transformer, wherein the second winding of the transformer is the input to a zeta converter, and wherein the zeta converter outputs an output voltage to a load. The three-level zeta asymmetrical half-bridge comprises each of the asymmetrical half-bridge, the resonant tank, the transformer, and the zeta converter.

In some examples, the switching elements comprise a switch, a (e.g. parasitic) diode and a (e.g. parasitic) capacitance in parallel; and optionally wherein the switching elements are each arranged to switch on when the voltage across the respective switching element is zero.

In some examples, the first pair of switching elements and the second pair of switching elements are arranged to operate in phase, to alternate the voltage applied to the resonant tank between the DC input voltage and ground.

In phase may be defined as each pair of switching elements applying a high voltage and a low voltage to the resonant tank at the same times, by switching the first switching element (e.g. main switching element) from each pair of switching elements on at the same time, and off at the same time. In phase may also be defined as switching the second switching element (e.g. complementary switching element) from each pair of switching elements on at the same time and off at the same time.

In some examples, the first portion and the second portion of the DC input voltage is equal to half the DC input voltage. In various examples, this may enable the converter to apply a constant, rather than variable, output voltage to the load.

In some examples, the DC input voltage is split across a first capacitor, across which the first portion of the DC input voltage is applied, and a second capacitor, across which the second portion of the DC input voltage is applied; wherein the first capacitor is in series with the second capacitor.

In some examples, the first pair of switching elements and the second pair of switching elements are arranged to operate out of phase.

Out of phase may be defined as the timing of switching of the first switching element from each pair of switching elements being different, i.e. they do not both switch on at the same time, or off at the same time, but one may switch on at the same time that the other switches off. The same is true for the second switching elements from each pair of switching elements.

In some examples, the first pair of switching elements and the second pair of switching elements are arranged to operate out of phase to alternate the voltage applied to the resonant tank between half the DC input voltage and ground.

In some examples, the first pair of switching elements and the second pair of switching elements are arranged to operate out of phase to alternate the voltage applied to the resonant tank between the DC input voltage and half the DC input voltage.

In some examples, the zeta converter comprises: a secondary resonant capacitance in series with the secondary winding of the transformer; a rectifying diode in series with the secondary winding of the transformer; an output inductor in series with the secondary resonant capacitance and in parallel with the rectifying diode; an output capacitor in series with the output inductor; and wherein the DC output voltage is applied to a load in parallel with the output capacitor and in series with the output inductor.

In some examples, the zeta converter comprises: a rectifying switching element comprising a switch and a diode in parallel, wherein the rectifying switching element is in series with the secondary winding of the transformer; an output inductor in series with the secondary resonant capacitance and in parallel with the rectifying switching element; an output capacitor in series with the output inductor; and wherein the DC output voltage is applied to a load in parallel with the output capacitor and in series with the output inductor.

In some examples, the rectifying switching element is a MOSFET with an integrated (e.g. parasitic) body diode and switch.

In some examples, the transformer is a tapped transformer; and wherein the zeta converter comprises: a rectifying diode in series with the secondary winding of the transformer; an output inductor connected part-way along the secondary winding of the transformer; an output capacitor in series with the output inductor; wherein the DC output voltage is applied to a load in parallel with the output capacitor and in series with the output inductor; and wherein the zeta converter further comprises a secondary resonant capacitance in series with each of the secondary winding of the transformer, the rectifying diode, and the output inductor.

A tapped transformer may be defined as a transformer wherein the secondary winding of the transformer has an additional output part-way along the length of the secondary transformer winding.

In some examples, the transformer is a centre tapped transformer, i.e. the transformer is tapped at the centre.

In some examples, the transformer is a tapped transformer; and wherein the zeta converter comprises: a rectifying switching element comprising a switch and a diode in parallel, wherein the active rectifying switching element is in series with the secondary winding of the transformer; an output inductor connected part-way along the secondary winding of the transformer; an output capacitor in series with the output inductor; wherein the DC output voltage is applied to a load in parallel with the output capacitor and in series with the output inductor; and wherein the zeta converter further comprises a secondary resonant capacitance in series with each of the secondary winding of the transformer, the rectifying switching element, and the output inductor.

In various examples, any switching elements using actively controlled power semiconductor technology may be used. In various examples, instead of MOSFETs any of IGBTs, HEMTs or bidirectional switches are used as alternatives, or in combination with MOSFETs. In some examples, the rectifying switching element is a MOSFET with an integrated body diode and switch.

In some examples, the transformer is a step-down transformer. In some examples, the transformer is a step-up transformer. In some examples, the transformer is a one to one transformer.

In some examples, the primary resonant inductance is the leakage inductance of the primary winding of the transformer.

In some examples, the switching elements are arranged to alternate the voltage of the resonant tank between the low voltage and the high voltage at a fixed frequency.

In some examples, a proportion of time that the voltage applied to the resonant tank is a high voltage may be varied.

In some examples, the switching elements are arranged to operate to generate a square wave to the resonant tank such that the voltage of the resonant tank is a square wave.

When viewed from a second aspect, the present disclosure provides a method of operating a three-level zeta asymmetrical half-bridge (e.g. according to any of the examples herein) to convert a DC input voltage into a DC output voltage, wherein the three-level zeta asymmetrical half-bridge comprises:

an asymmetrical half-bridge, comprising a first pair of switching elements, and a second pair of switching elements in series with the first pair of switching elements;

a resonant tank in parallel with one switching element from each pair of switching elements, the resonant tank comprising a magnetising inductance of a primary winding of a transformer, a resonant inductance and a primary resonant capacitance; and a zeta converter connected to a secondary winding of the transformer; the method comprising:

applying a first portion of the DC input voltage in parallel with the first pair of switching elements;

applying a second portion of the DC input voltage in parallel with the second pair of switching elements;

operating each pair of switching elements in a sequence to selectively connect and disconnect the resonant tank to the respective first or second portion of the DC input voltage, such that a voltage of the resonant tank alternates between a low voltage and a high voltage;

the resonant tank filtering out a DC component of the voltage of the resonant tank and outputting a filtered resonant tank voltage to the primary winding of the transformer; and the zeta converter rectifying the output of the secondary winding of the transformer to output the DC output voltage.

In some examples, the method further comprises switching the switching elements on when the voltage across the respective switching element is zero.

In some examples, the method further comprises operating first pair of switching elements and the second pair of switching elements in phase to alternate the voltage applied to the resonant tank between the DC input voltage and ground.

In some examples, the method further comprises splitting the DC input voltage across a first capacitor, across which the first portion of the DC input voltage is applied, and a second capacitor, across which the second portion of the DC input voltage is applied.

In some examples, the method further comprises operating the first pair of switching elements and the second pair of switching elements out of phase to alternate the voltage applied to the resonant tank between half the DC input voltage and ground.

In some examples, the method further comprises operating the first pair of switching elements and the second pair of switching elements out of phase to alternate the voltage applied to the resonant tank between the DC input voltage and half the DC input voltage.

In some examples, the method further comprises operating the switching elements to alternate the voltage of the resonant tank between the low voltage and the high voltage at a fixed frequency.

In some examples, the method further comprises operating the switching elements to alternate the voltage of the resonant tank between the low voltage and the high voltage, and a proportion of time that the voltage applied to the resonant tank is a high voltage may be varied.

In some examples, the method further comprises operating the switching elements to generate a square wave to the resonant tank, such that the voltage of the resonant tank is a square wave.

BRIEF DESCRIPTION OF DRAWINGS

One or more non-limiting examples will now be described, by way of example only, and with reference to the accompanying figures in which.

DETAILED DESCRIPTION

Figure 1:
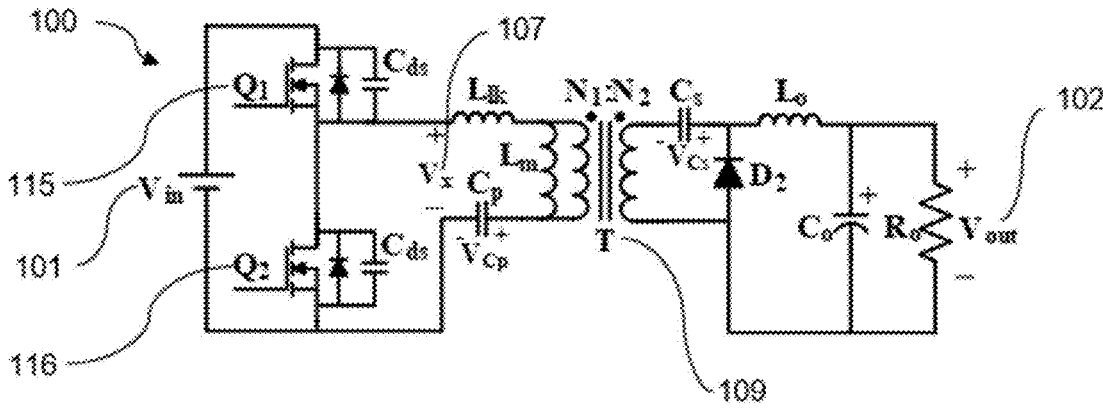
FIG. 1 shows a two-level zeta asymmetrical half-bridge.

Referring to FIG. 1, a two-level zeta asymmetrical half-bridge 100 converts a DC input voltage $V_{in}$ 101 to a DC output voltage $V_{out}$ 102.

The two-level zeta asymmetrical half-bridge 100 operates by switching MOSFETs $Q_1$ 115 and $Q_2$ 116 to alternate the tank voltage $V_x$ 107 between either zero or the input voltage $V_{in}$.

The transformer 109 is configured as either a step up or step down transformer, depending on the turns ratio between the primary and secondary windings of the transformer 109.

The input side of the transformer 109 is an asymmetrical half-bridge and the output is the same as that of a zeta converter. This design is known as a two-level zeta asymmetrical half bridge 100, as the circuit is designed to alternate the tank voltage $V_x$ 107 between two voltage levels, zero or the input voltage $V_{in}$ 101.

Figure 2:
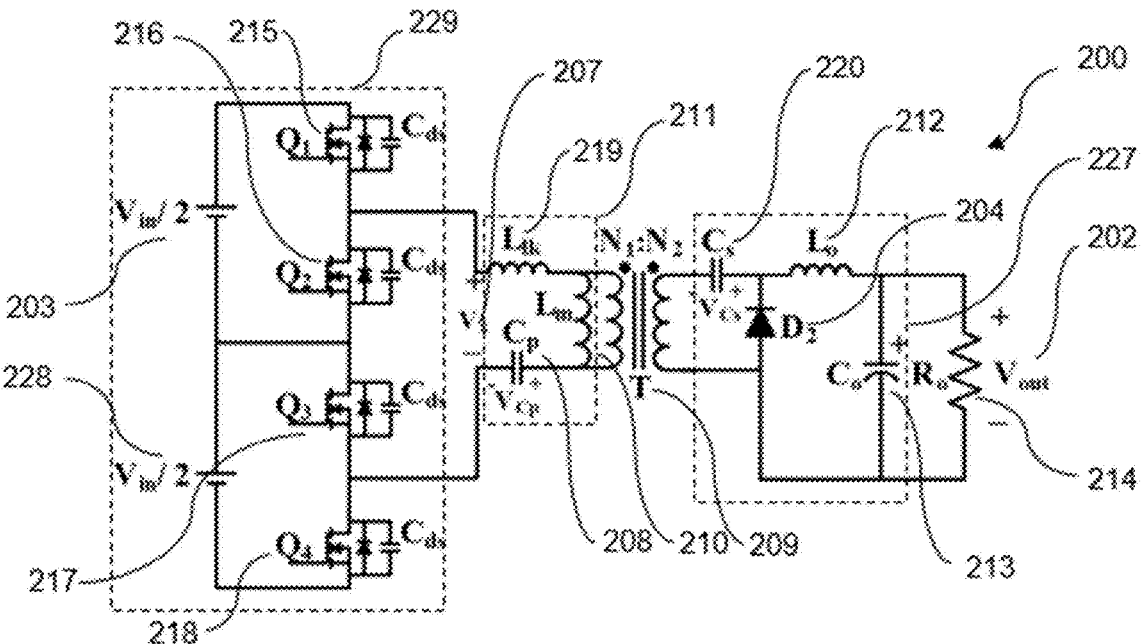
FIG. 2 shows a three-level zeta asymmetrical half-bridge according to the present disclosure.

Referring to FIG. 2, a three-level zeta asymmetrical half-bridge 200, according to the present disclosure converts an input voltage $V_{in}$ to an output voltage $V_{out}$ 202. FIG. 2 shows the input voltage split equally into a first input 203 and a second input 228, each of half the input voltage $V_{in}/2$. While in this example, both inputs 203, 228 are equal to half the input voltage $V_{in}/2$, it will be appreciated that each input 203, 228 is not required to be the same value, i.e. the input voltage $V_{in}$ could be split unequally. However, splitting the voltage equally helps to balance the voltage stress over each of the first and second pairs of switching elements and may help to ensure a constant current is applied to the load.

The three-level zeta asymmetric half-bridge 200 has a resonant tank 211. The resonant tank comprises a resonant inductance, which is the leakage inductance of the transformer $L_{lk}$ 219 a primary resonant capacitance $C_p$ 208; and a magnetising inductance $L_m$ 210 of the transformer 209. The voltage applied to the resonant tank 211 is the tank voltage $V_x$ 207. In operation, this tank voltage is a square wave that varies between a high voltage and a low voltage at a fixed frequency. The role of the resonant tank 211 is to filter out the DC component of the tank voltage $V_x$ 207, outputting only the AC square waveform of the tank voltage $V_x$ 207 to the input of the transformer 209. Using a resonant tank helps to enable the circuit to operate using soft switching, i.e. zero-voltage and/or zero-current switching.

The transformer 209 has a turns ratio N1:N2 between the primary, input, winding and secondary, output, winding.

The output of the transformer 209 is the input of a zeta converter 227. The zeta converter 227 has a secondary resonant capacitance $C_s$ 220; a diode $D_2$ 204; an inductor $L_o$ 212 and a capacitor $C_o$ 213. The zeta converter 227 converts the AC output of the transformer 209 into a DC voltage $V_{out}$ 202. The output $V_{out}$ 202 of the zeta converter 227 is applied to a load $R_o$ 214. Using a zeta converter helps to simplify the control of the circuit, due to a linear static gain and tank to output voltage gain. Various examples of zeta converters may be used with this disclosure.

The three-level zeta asymmetrical half-bridge 200 has an asymmetrical half-bridge 229 made up of a plurality of switching elements $Q_1$ 215, $Q_2$ 216, $Q_3$ 217 and $Q_4$ 218. In this example, each switching element 215, 216, 217, 218 is a MOSFET with an integrated body diode and a parasitic drain source capacitance $C_{ds}$. However, in various examples it will be apparent that other switching elements are possible, and therefore a MOSFET does not need to be used. In various examples, any switching elements using actively controlled power semiconductor technology may be used. In various examples, instead of MOSFETs any of IGBTs, HEMTs or bidirectional switches may be used as alternatives, or in combination with MOSFETs. This arrangement helps to enable soft switching to be used in the switch on operations of the switching elements.

In this example, the first input voltage 203 is split across a first pair of switching elements $Q_1$ 215 and $Q_2$ 216. The second input voltage 228 is split across a second pair of switching elements $Q_3$ 217 and $Q_4$ 218. Each pair has a first switching element, $Q_1$ 215 and $Q_4$ 218 respectively, and a second switching element, $Q_2$ 215 and $Q_3$ 216 respectively. The tank voltage $V_x$ 207 is the sum of the voltage across the second switching element of the pair, $Q_2$ 215 and $Q_3$ 216, of each pair of switching elements, $Q_1$ 215 and $Q_2$ 216, and $Q_3$ 217 and $Q_4$ 218.

The asymmetrical half-bridge 229 operates by switching the switching elements $Q_1$ 215, $Q_2$ 216, $Q_3$, 217 and $Q_4$ 218 in any one of three predetermined sequences, each corresponding to one of three modes of operation. In each mode of operation, the tank voltage $V_x$ 207 is a square wave switching at a fixed frequency between a high voltage and a low voltage. Hence, in this example, fixed frequency pulse width modulation is preferably used. While the voltage switching frequency is fixed, the duty cycle may be varied and this enables the circuit to convert a wide range of input voltages to a specific output voltage. Therefore, the three-level zeta asymmetrical half-bridge 200 has an advantage over a traditional LLC resonant converter which has to operate with high frequency variation over a wide input voltage range. Fixed frequency operation significantly simplifies the EMI filtering required at the input to the three-level zeta asymmetrical half-bridge 200.

In mode 1 operation, the tank voltage $V_x$ 207 alternates between zero and half the input voltage $V_{in}/2$. In mode 2 operation, the tank voltage $V_x$ 207 alternates between half the input voltage $V_{in}/2$ and the input voltage $V_{in}$. In mode 3 operation, the tank voltage $V_x$ 207 alternates between zero and the input voltage $V_{in}$. Hence, this circuit is known as a three-level zeta asymmetrical half-bridge due to the three possible voltage levels of the tank voltage $V_x$ 207.

Mode 1, mode 2 and mode 3 operation of the three-level zeta asymmetrical half-bridge 200 will be outlined below with reference to additional figures. Mode 3 operation of the three-level zeta asymmetrical half-bridge 200 is analogous with operation of the two-level zeta asymmetrical half-bridge 100 and will be described first. Various benefits of the three-level zeta asymmetrical half-bridge 200 over the two-level zeta asymmetrical half-bridge 100, even in mode 3 operation, will be discussed.

Modes 1 and 2 of operation of the three-level zeta asymmetrical half-bridge 200 are novel over the two-level zeta asymmetrical half bridge 100 and have additional advantages over it, which will also be discussed in more detail.

Referring to FIGS. 3a to 3f and FIG. 4, a mode of operation of the three-level zeta asymmetrical half-bridge 200 of FIG. 2 is shown. The shaded elements in FIGS. 3a to 3f indicate no conduction. The mode of operation outlined in FIGS. 3a to 3f and FIG. 4 is referred to as mode 3. In FIGS. 3a to 3f, the input voltage $V_{in}$ 201 is split evenly between a first capacitor 206 and a second capacitor 230. The voltage of the capacitors 206, 230 corresponds to the input voltages $V_{in}/2$ 203, 228 of FIG. 2.

Figure 3A:
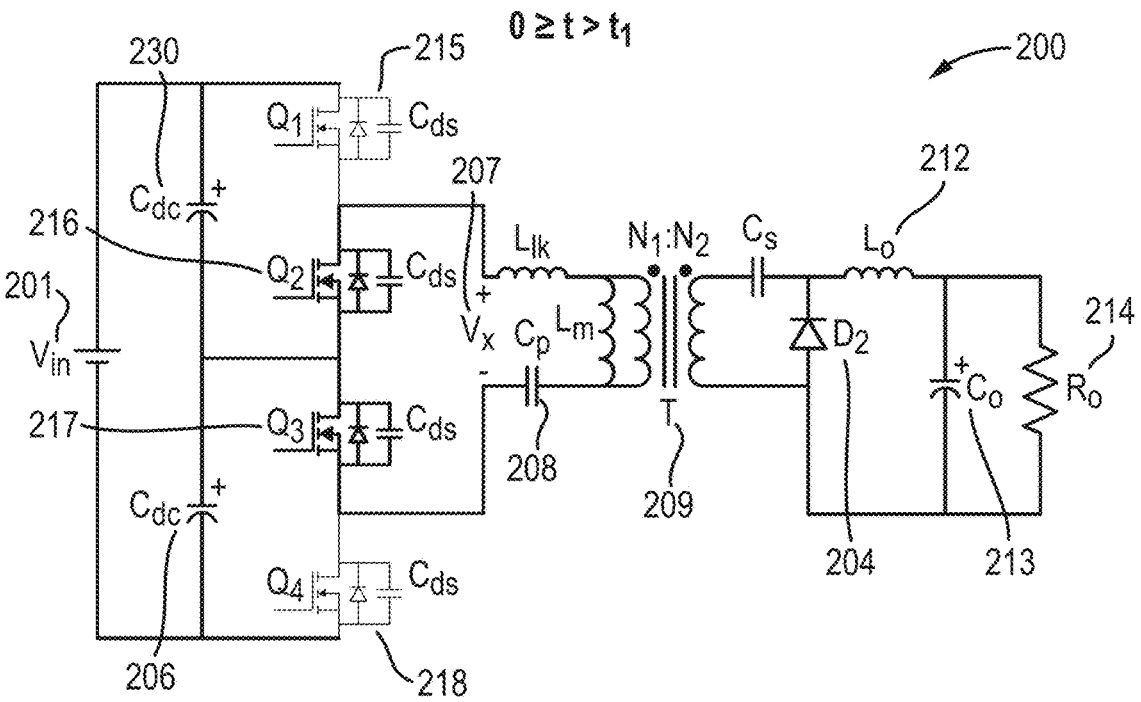
FIGS. 3a to 3f show different operating states of the three-level zeta asymmetrical half-bridge of FIG. 2 during mode 3 operation.
Figure 3B:
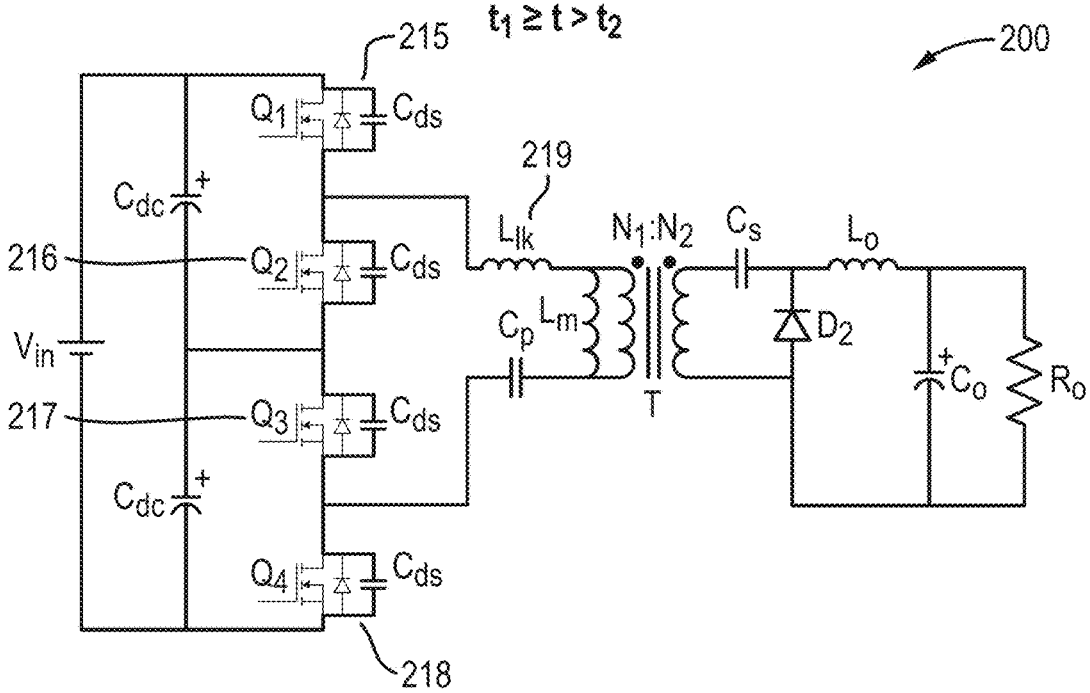
Figure 3C:
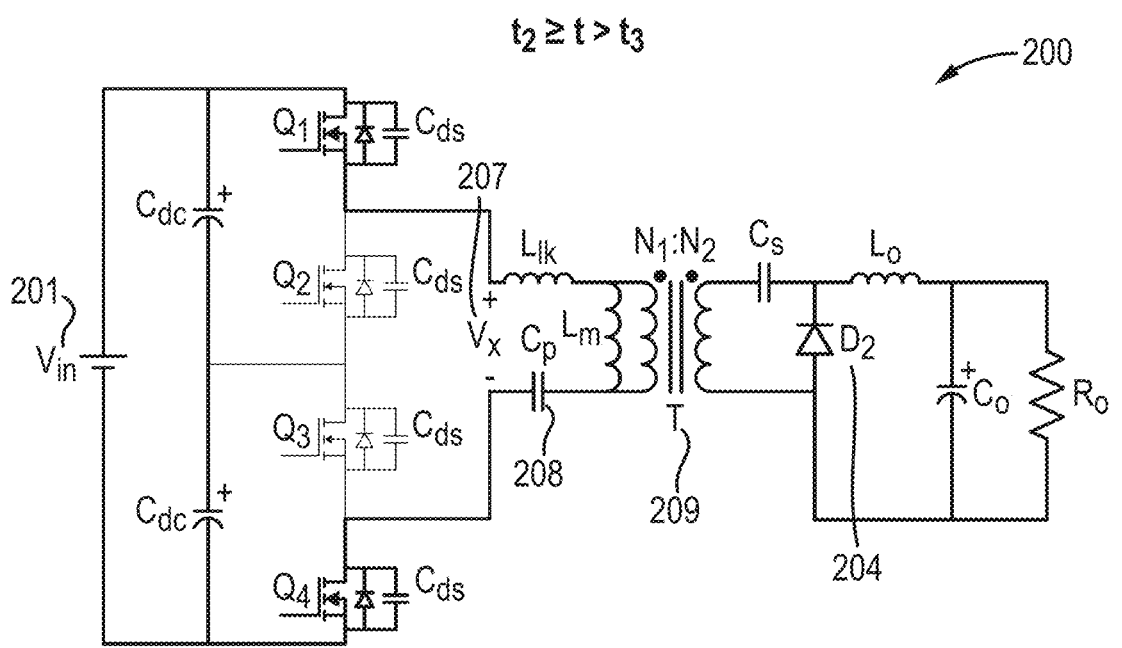
Figure 3D:
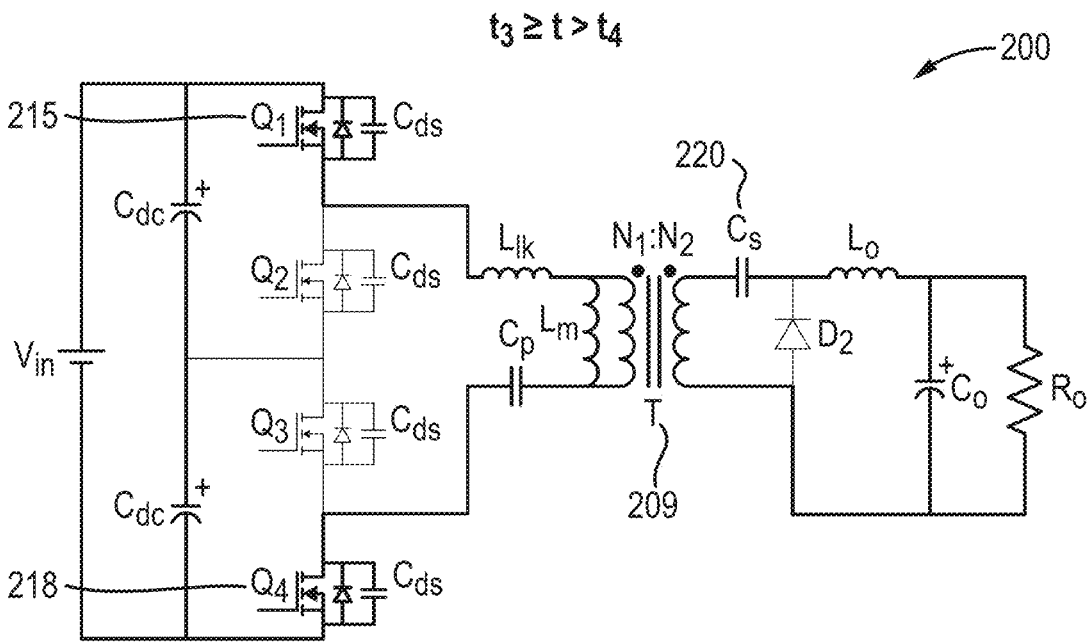
Figure 3E:
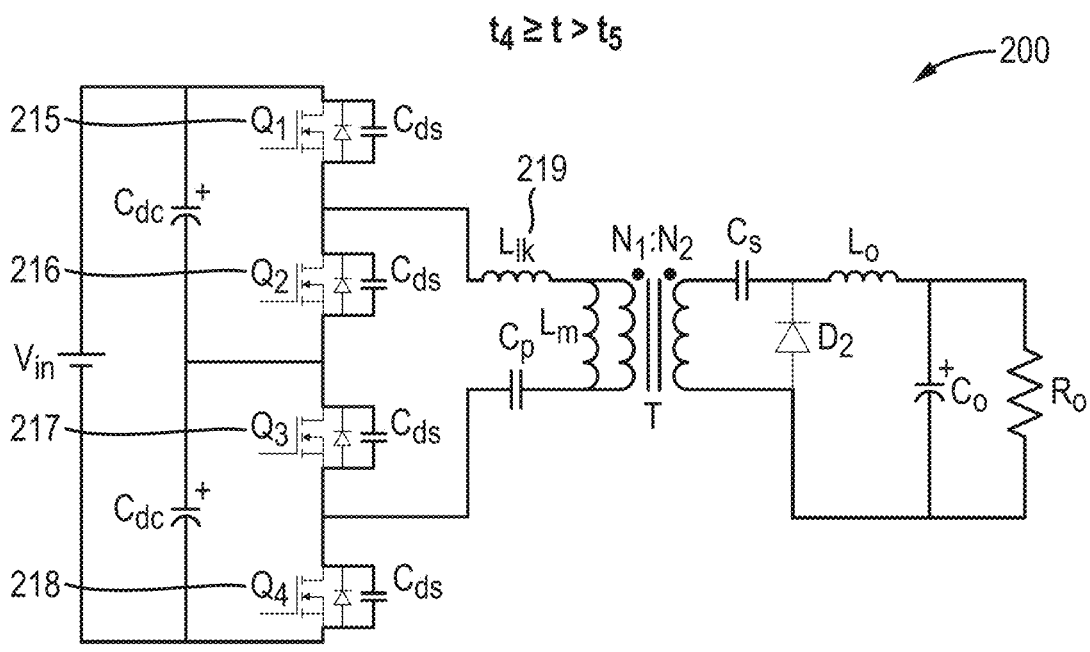
Figure 3F:
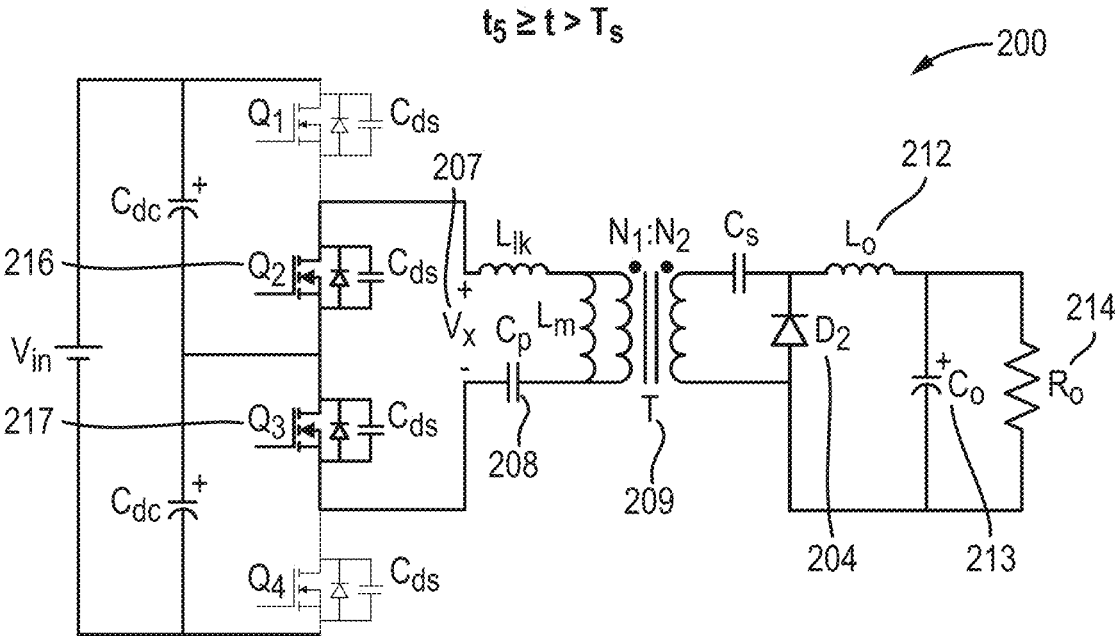
Figure 4:
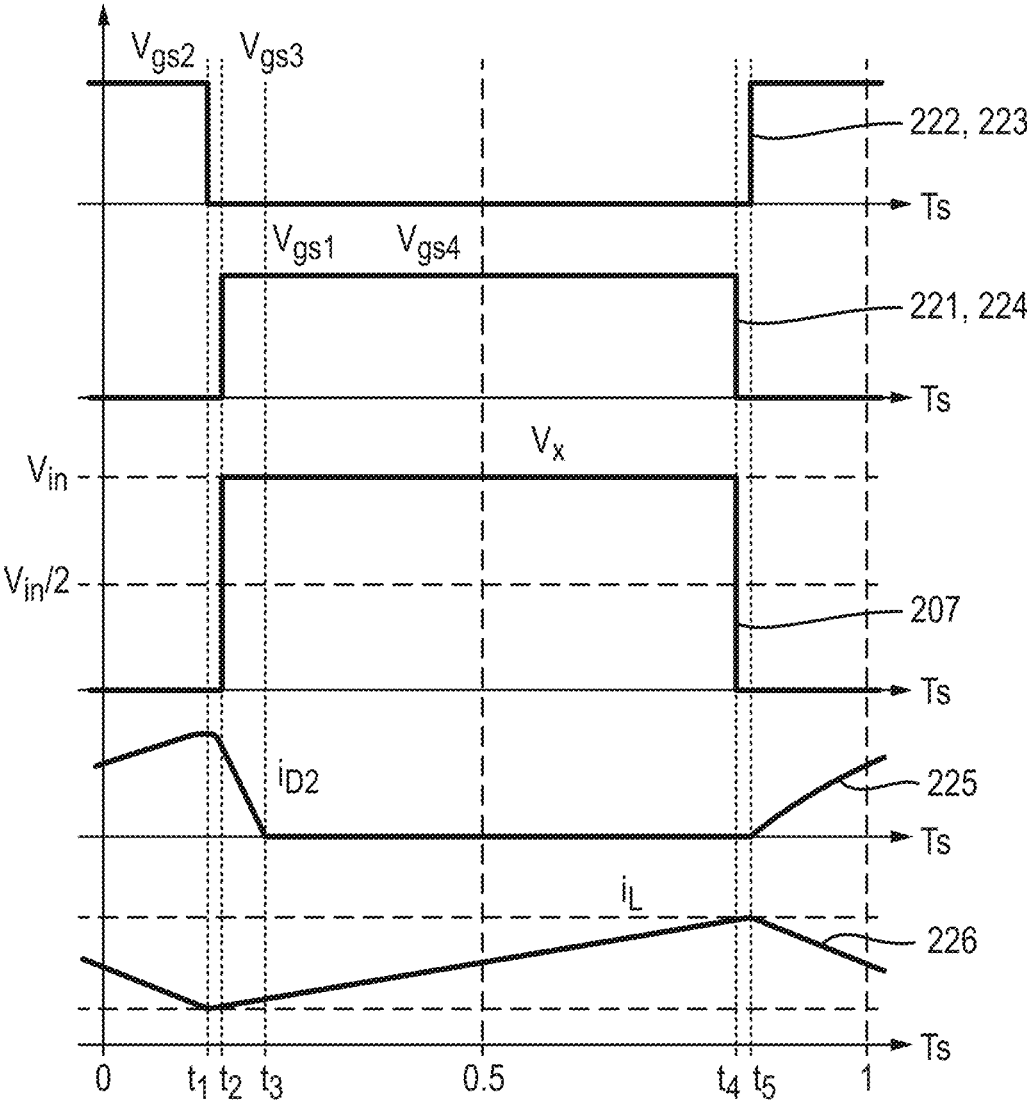
FIG. 4 shows waveforms of voltages and currents during the mode 3 operation of FIGS. 3a to 3f.

Referring to FIG. 4, waveforms are shown between $t_0$ and $T_s$ for mode 3 operation, as described in FIGS. 3a to 3f, of the three-level zeta asymmetrical half-bridge 200 of FIG. 2. The waveforms shown represent the gate-source voltage 222 of the switching element $Q_2$ 216; the gate-source voltage 221 of the switching element $Q_1$ 215; the tank voltage $V_x$ 207; the current 225 through the diode $D_2$ 204; and the current 226 through the inductor $L_o$ 212. The current 226 is filtered by the capacitor $C_o$ 213 such that, ideally, a constant current is provided to the load $R_o$.

In mode 3 operation, the gate-source voltage 222 of the switching element $Q_2$ 216 is the same as the gate-source voltage 223 of the switching element $Q_3$ 217. In mode 3 operation, the gate-source voltage 221 of the switching element $Q_1$ 215 is the same as the gate-source voltage 224 of the switching element $Q_4$ 218.

Between times $t_0$ and $t_1$, as shown in FIG. 3a and FIG. 4, the tank voltage $V_x$ 207 is equal to zero. $V_{cp}$, the voltage across the primary resonant capacitance $C_p$ 208, is applied to the primary winding of the transformer 209. The current 225 through the diode $D_2$ 204 increases as the inductor $L_o$ 212 and the capacitor $C_o$ 213 supply energy to the load $R_o$ 214. This time interval ends when the switching elements $Q_2$ 216 and $Q_3$ 217 are switched off at time $t_1$.

Between times $t_1$ and $t_2$, as shown in FIG. 3b and FIG. 4, the resonant current through the transformer $L_{lk}$ 219 starts to charge the drain source capacitances of the switching elements $Q_2$ 216 and $Q_3$ 217 to half the input voltage $V_{in}/2$; and discharge the drain source capacitances of the switching elements $Q_1$ 215 and $Q_4$ 218 to zero. Before time $t_2$, the voltages 221, 224 over the switching elements $Q_1$ 215 and $Q_4$ 218 reach zero, and their body diodes will start conducting, thus clamping the switching elements $Q_2$ 216 and $Q_3$ 217 at half the input voltage $V_{in}/2$. At time $t_2$ the switching elements $Q_1$ 215 and $Q_4$ 218 are switched on.

As there is no voltage 221, 224 across the switching elements $Q_1$ 215 or $Q_4$ 218 when they are switched on, this is a first example of zero voltage switching, which is used several times in the operation of the three-level zeta asymmetrical half-bridge 200. There are various benefits of zero voltage switching, including that it minimises any voltage or power loss over the switching elements of the circuit and minimises the EMI effects of switching. Further benefits include minimising the temperature increase corresponding to power loss in the switching elements, thereby reducing the cooling requirements of the circuit and prolonging the life of the device.

Between times $t_2$ and $t_3$, as shown in FIG. 3c and FIG. 4, the tank voltage $V_x$ 207 is equal to the input voltage $V_{in}$ 201. The voltage applied to the primary winding of the transformer 209 is the tank voltage $V_x$ 207 minus the voltage $V_{cp}$, the voltage across the primary resonant capacitance $C_p$ 208. The current 225 through the diode $D_2$ 204 starts to decrease. At time $t_3$, the current 225 through the diode $D_2$ 204 is zero and so the diode $D_2$ 204 is blocked.

Between times $t_3$ and $t_4$, as shown in FIG. 3d and FIG. 4, the output is still charged by the secondary winding of the transformer 209 and the secondary resonant capacitance $C_s$ 220. At time $t_4$, the switching elements $Q_1$ 215 and $Q_4$ 218 are turned off, thus starting the dead-time period to ensure zero voltage switching operation. Dead-time may be defined as the sufficient time to guarantee safe switching in a power converter.

Between times $t_4$ and $t_5$, as shown in FIG. 3e and FIG. 4, the resonant current through the transformer $L_{lk}$ 219 starts to charge the drain source capacitances of the switching elements $Q_1$ 215 and $Q_4$ 218 to half the input voltage $V_{in}/2$; and discharge the drain source capacitances of the switching elements $Q_2$ 216 and $Q_3$ 217 to zero. Before time $t_5$, the voltages 222, 223 over the switching elements $Q_2$ 216 and $Q_3$ 217 will reach zero, and their body diodes will start conducting, thus clamping the switching elements $Q_1$ 215 and $Q_4$ 218 at half the input voltage $V_{in}/2$. At $t_5$ the switching elements $Q_2$ 216 and $Q_3$ 217 switch on, again using zero voltage switching.

Between times $t_5$ and $T_8$, as shown in FIG. 3f and FIG. 4, the tank voltage $V_x$ 207 is equal to zero. The voltage $V_{cp}$, the voltage across the primary resonant capacitance $C_p$ 208, is applied to the primary winding of the transformer 209. The current 225 through the diode $D_2$ 204 increases as the inductor $L_o$ 212 and the capacitor $C_o$ 213 supply energy to the load $R_o$ 214. At this point, the circuit state is equal to the interval from $t_0$ to $t_1$.

Referring to FIG. 1, FIG. 2, FIGS. 3a to 3f, and FIG. 4; mode 3 operation of the three-level zeta asymmetric half-bridge 200 is analogous with operation of the two-level zeta half-bridge 100. The switching elements $Q_1$ 215 and $Q_4$ 218 of the three-level zeta asymmetric half-bridge 200 operate analogously to the switching element $Q_1$ 115 of the two-level zeta asymmetric half-bridge 100; and the switching elements $Q_2$ 216 and $Q_3$ 217 of the three-level zeta asymmetric half-bridge 200 operate analogously to the switching element $Q_2$ 116 of the two-level zeta asymmetric half-bridge 100.

However, as the input voltage 201 to the three-level zeta asymmetric half-bridge 200 is split, when compared with an equivalent two-level zeta asymmetrical half-bridge 100 the three-level zeta asymmetrical half-bridge 200 at the same voltage switching frequency may be able to use smaller passive components and may have reduced voltage stress over the semiconductors. This may result in improvements in power density and specific power, despite the increased number of active components required. In other words, the voltages across the switching elements $Q_1$ to $Q_4$ 215, 216, 217, 218 in the three-level zeta asymmetrical half-bridge 200 is half the voltage across the switching elements $Q_1$ 115 and $Q_2$ 116 in the corresponding two-level zeta asymmetrical half bridge 100. This also reduces in a reduction of the associated cooling requirements.

In addition, the three-level zeta asymmetrical half-bridge 200 offers two additional modes of operation, modes 1 and 2. In these modes, the MOSFETs $Q_1$ 215 and $Q_2$ 216 are operated as a pair and the MOSFETs $Q_3$ 217 and $Q_4$ 218 operate as a pair. The first pair of MOSFETs 215 and 216 operates out of phase with the second pair of MOSFETs 217 and 218, which results in the tank voltage $V_x$ 207 switching at twice the switching frequency of the MOSFETs 215, 216, 217, 218. Therefore, in modes 1 and 2 operation, half the amplitude of variation of the tank voltage $V_x$ 207 results in the same power transfer as an equivalent two-level zeta asymmetrical half-bridge 100. In mode 1 operation, the voltage varies between zero and half the input voltage $V_{in}/2$; while in mode 2 operation the voltage varies between half the input voltage $V_{in}/2$ and the input voltage $V_{in}$.

As a result of the reduction in the amplitude of the variation of the tank voltage $V_x$ 207; when compared with an equivalent two-level zeta asymmetric half-bridge 100, a three-level zeta asymmetrical half-bridge 200 in modes 1 and 2 of operation may have beneficial transformer 209 properties. For example when the three-level zeta asymmetrical half-bridge 200 is used in step-down applications, compared with an equivalent two-level zeta-asymmetrical half-bridge 100 it may be able to use a smaller transformer 209, with half the turns ratio.

Alternatively, a transformer 209 with the same turns ratio may be used, and in this case the three-level zeta asymmetrical half-bridge 200 in modes 1 and 2 of operation will only need to operate the switching elements $Q_1$ 215, $Q_2$ 216, $Q_3$, and $Q_4$ at half the switching frequency. This may lead to a significant reduction in switching losses. A compromise between the benefits in transformer 209 size and switching frequency may be determined during the circuit design. Modes 1 and 2 will be described in more detail with reference to additional figures below. Various of these benefits also apply to step-up applications and one to one DC to DC conversion.

Referring to FIGS. 5a to 5k and FIG. 6, a mode of operation of the three-level zeta asymmetrical half-bridge 200 of FIG. 2 is shown. The shaded elements in FIGS. 5a to 5k indicate no conduction. The mode of operation outlined in FIGS. 5a to 5k and FIG. 6 is referred to as mode 1. In FIGS. 5a to 5k, the input voltage $V_{in}$ 201 is split evenly between a first capacitor 206 and a second capacitor 230. The voltage of the capacitors 206, 230 corresponds to the input voltages $V_{in}/2$ 203, 228 of FIG. 2.

Figure 5A:
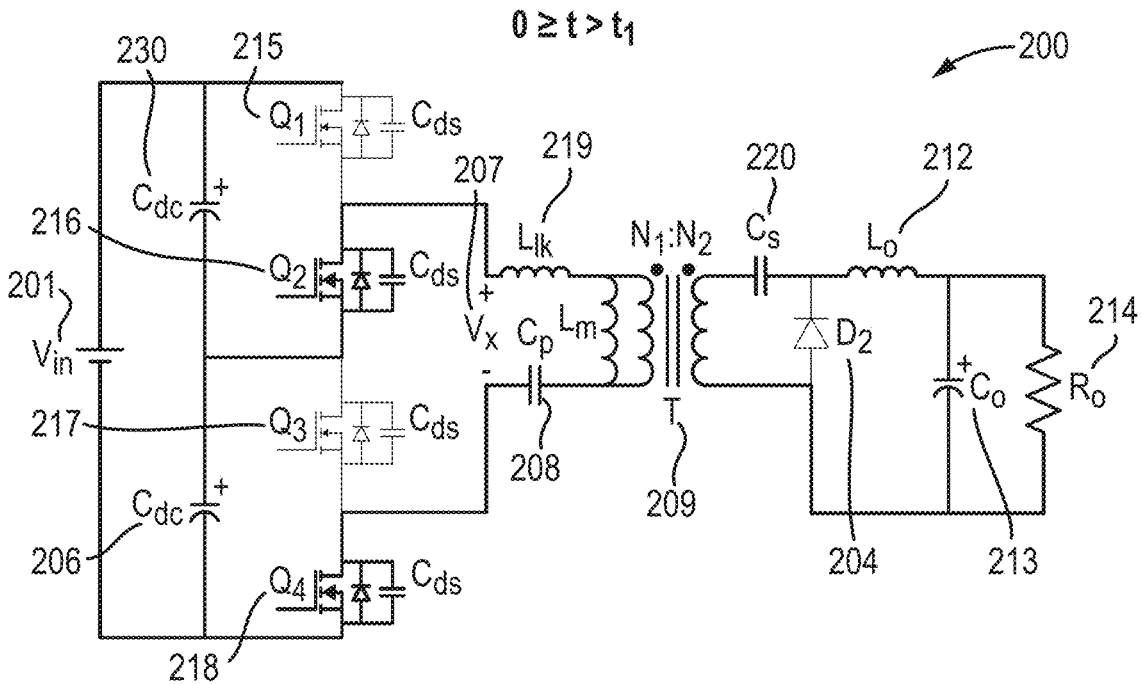
FIGS. 5a to 5k show different operating states of the three-level zeta asymmetrical half-bridge of FIG. 2 during mode 1 operation.
Figure 5B:
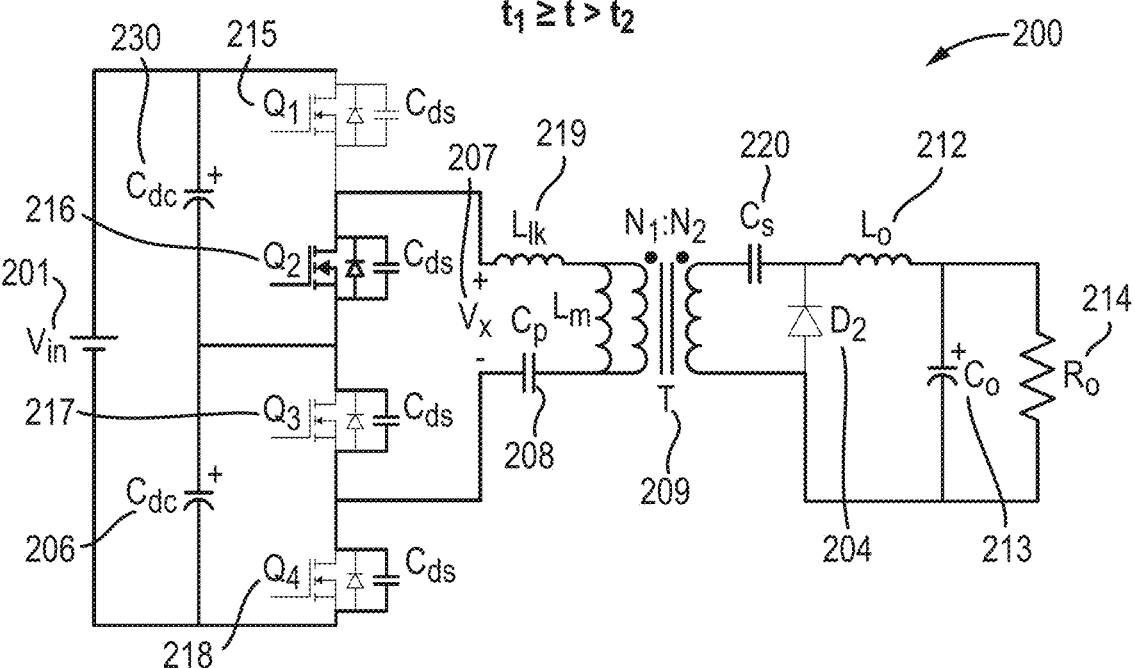
Figure 5C:
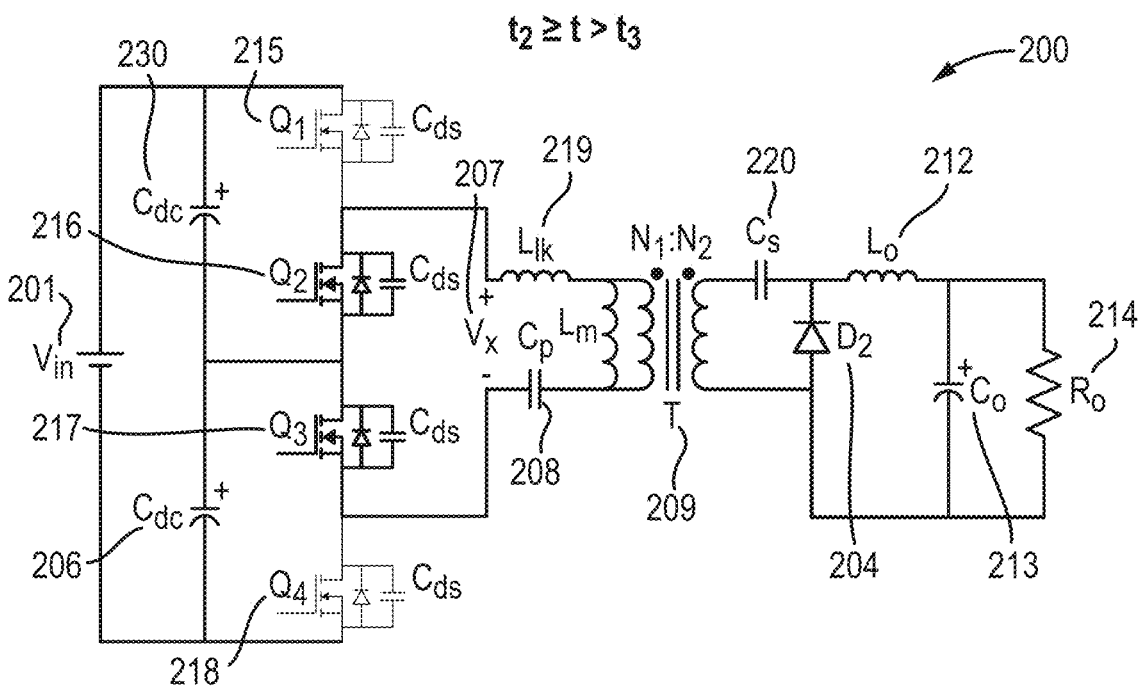
Figure 5D:
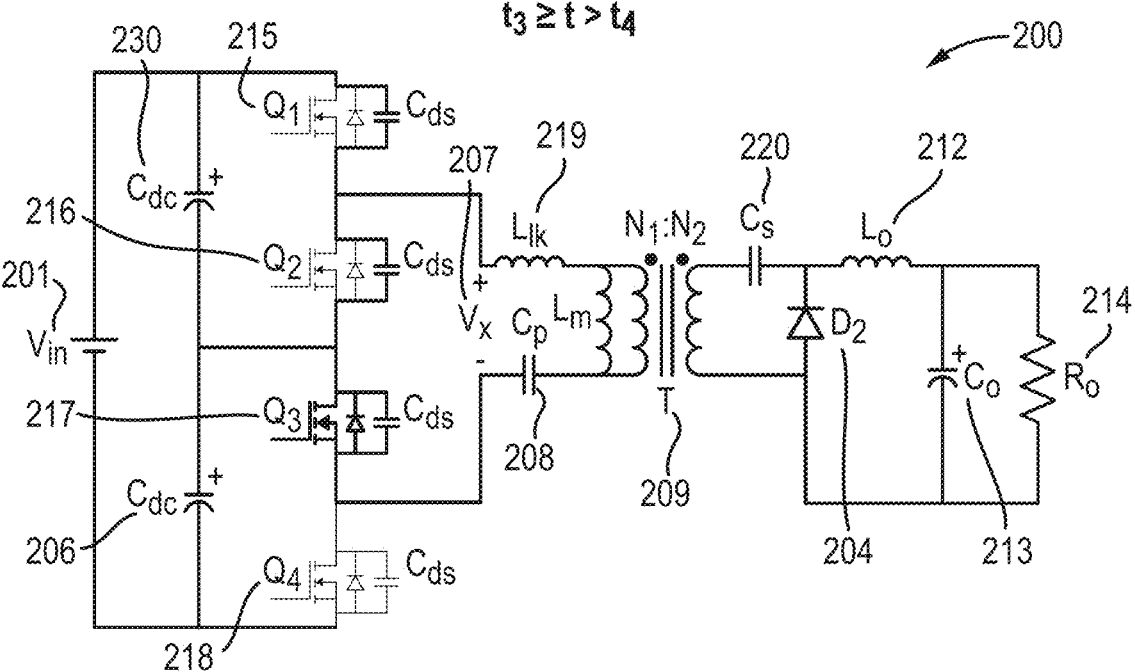
Figure 5E:
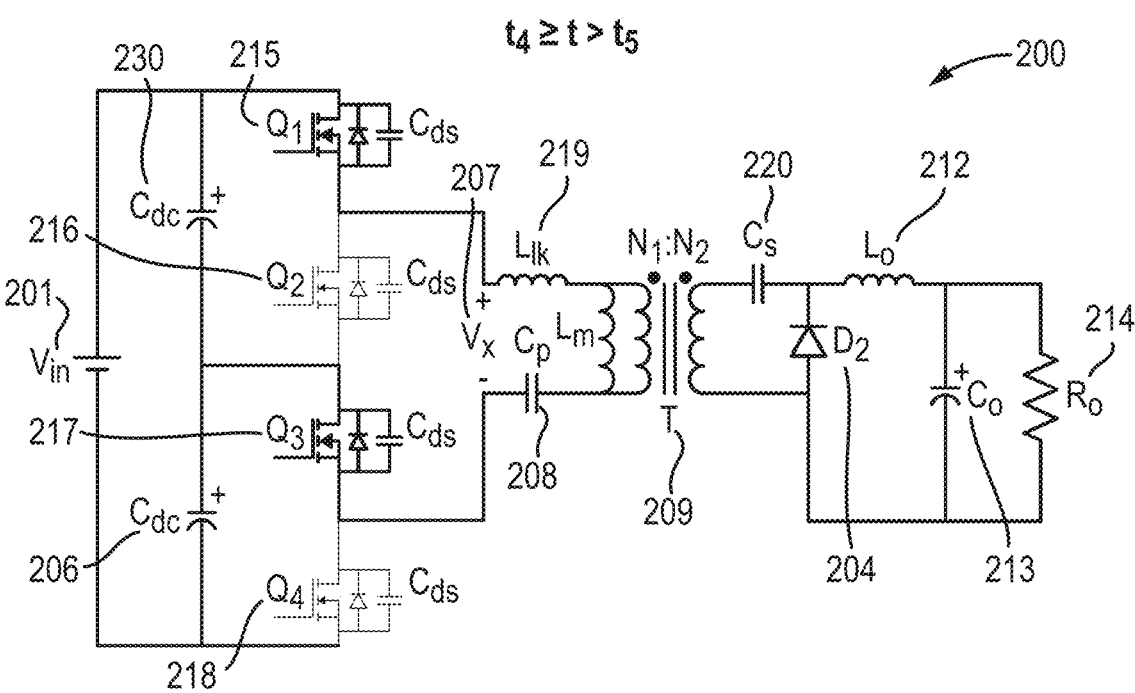
Figure 5F:
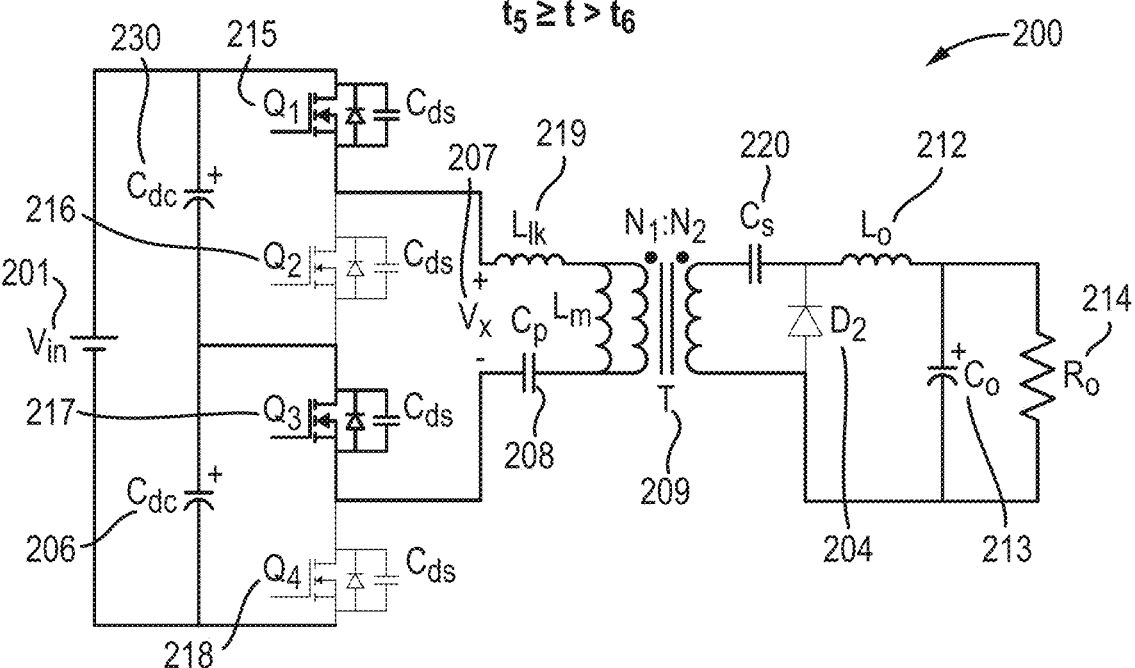
Figure 5G:
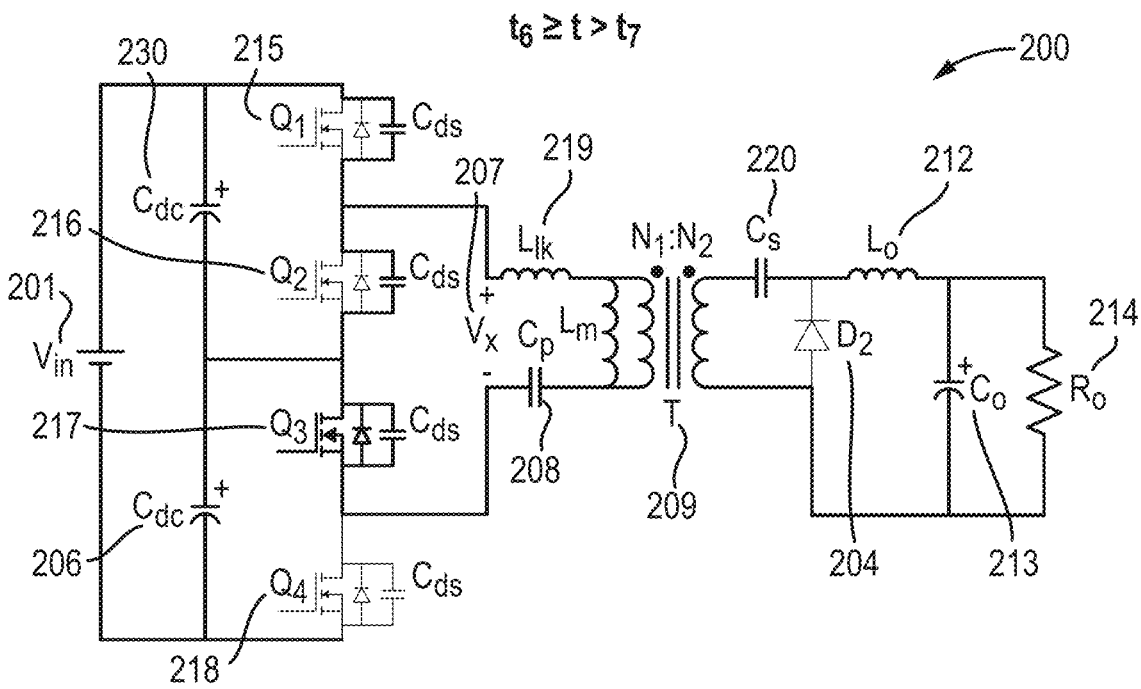
Figure 5H:
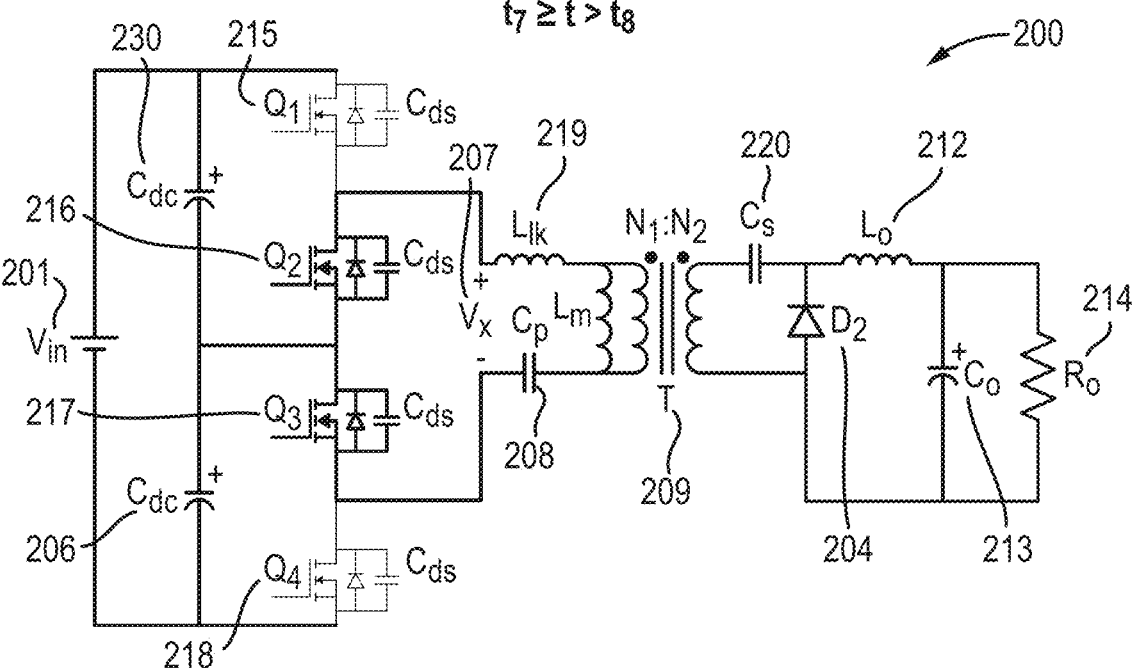
Figure 5I:
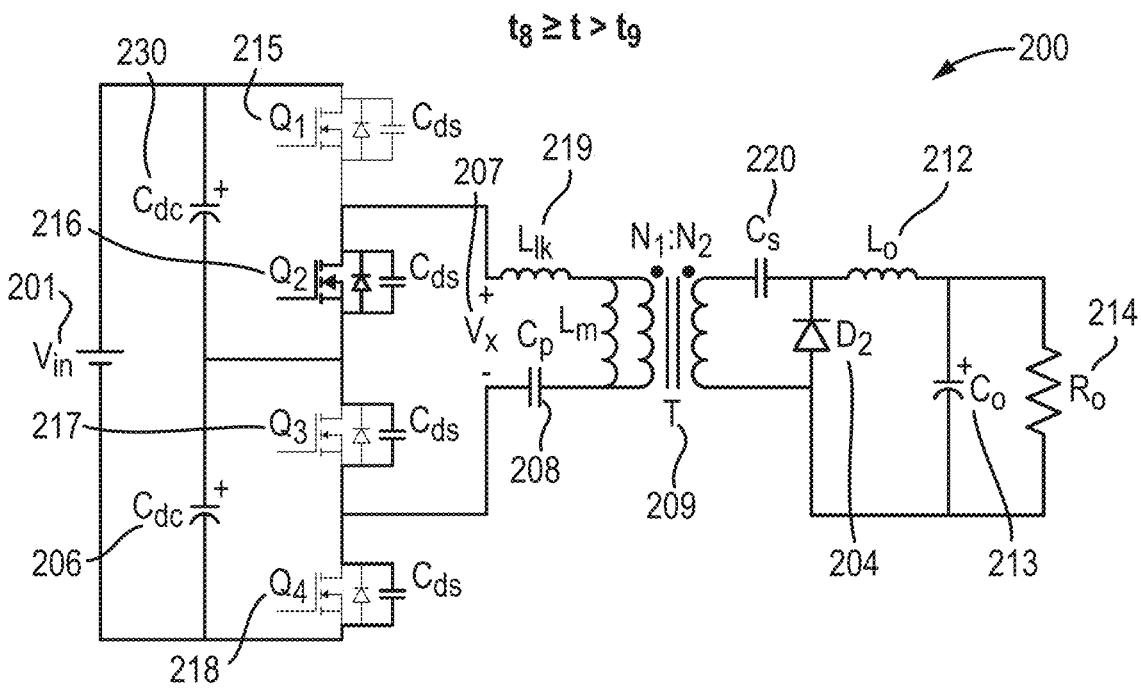
Figure 5J:
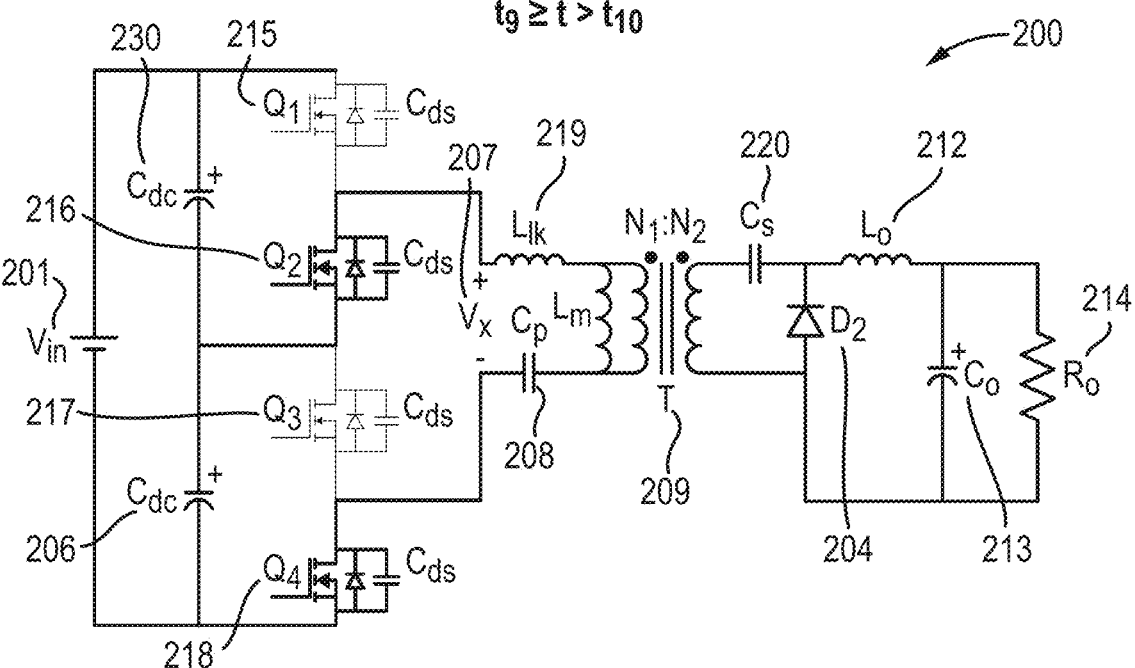
Figure 5K:
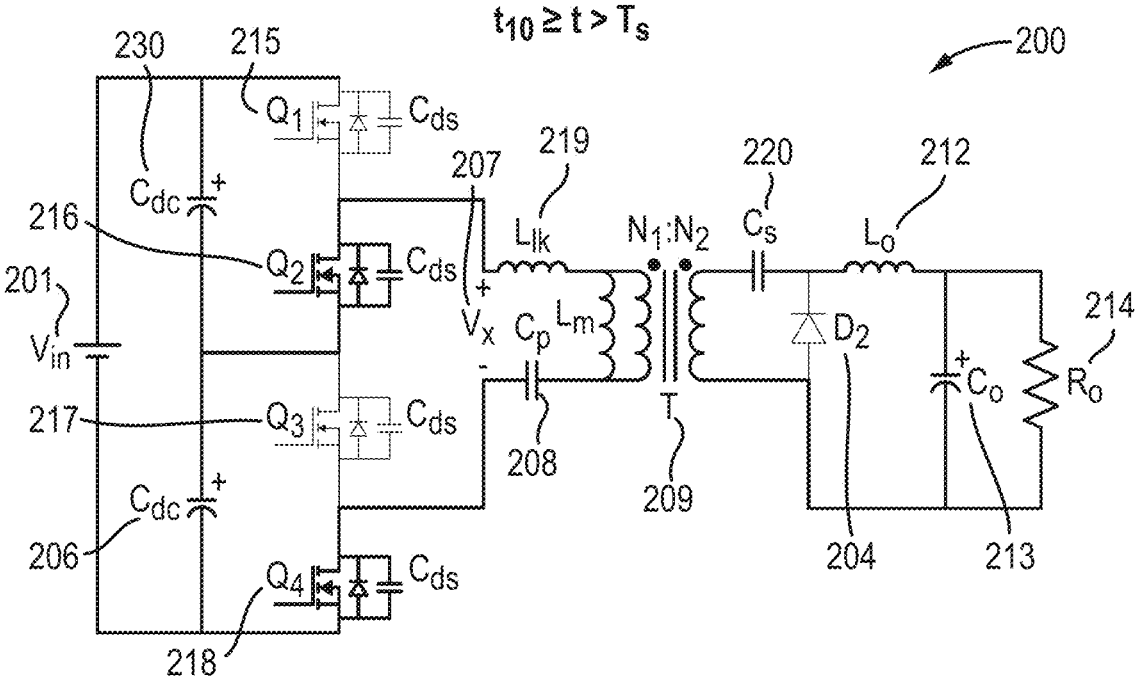
Figure 6:
FIG. 6 shows waveforms of voltages and currents during the mode 1 operation of FIGS. 5a to 5k.

Referring to FIG. 6, waveforms are shown between times $t_0$ and $T_s$ for mode 1 operation, as described in FIGS. 5a to 5k, of the three-level zeta asymmetrical half-bridge 200 of FIG. 2. The waveforms shown represent the gate-source voltage 221' of the switching element $Q_1$ 215; the gate-source voltage 222' of the switching element $Q_2$ 216; the gate-source voltage 223' of the switching element $Q_3$ 217; the gate-source voltage 224' of the switching element $Q_4$ 218; the tank voltage $V_x$ 207'; the current 225' through the diode $D_2$ 204; and the current 226' through the inductor $L_o$ 212. The current 226" is filtered by the capacitor $C_o$ 213 such that, ideally, a constant current is provided to the load $R_o$.

Between times to and $t_1$, as shown in FIG. 5a and FIG. 6, the tank voltage $V_x$ 207' is equal to half the input voltage $V_{in}/2$. The tank voltage $V_x$ 207' minus $V_{cp}$, the voltage across the primary resonant capacitance $C_p$ 208, is applied to the primary winding of the transformer 209. The output is charged by the secondary winding of the transformer 209 and the secondary resonant capacitance $C_s$. At time $t_1$, the switching element $Q_4$ 218 is turned off, thus starting the dead-time period to ensure zero voltage switching operation.

Between times $t_1$ and $t_2$, as shown in FIG. 5b and FIG. 6, the resonant current though the transformer $L_{lk}$ 219 starts to charge the drain source capacitance of the switching element $Q_4$ 218 towards half the input voltage $V_{in}/2$; and discharge the drain source capacitance of the switching element $Q_3$ 217 to zero. Before time $t_2$, the voltage 223' over the switching element $Q_3$ 217 will reach zero, and its body diode will start conducting, thus clamping the switching element $Q_4$ 218 at half the input voltage $V_{in}/2$. At time $t_2$ the switching element $Q_3$ 217 switches on, again using zero voltage switching.

Between times $t_2$ and $t_3$, as shown in FIG. 5c and FIG. 6, the tank voltage $V_x$ 207' is equal to zero. The voltage applied to the primary winding of the transformer is the tank voltage $V_x$ 207' minus $V_{cp}$, the voltage across the primary resonant capacitance $C_p$ 208. The current 225' through the diode $D_2$ 204 increases as the inductor $L_o$ 212 and the capacitor $C_o$ 213 supply energy to the load $R_o$ 214. This time interval ends when the switching element $Q_2$ 216 is switched off at time $t_3$.

Between times $t_3$ and $t_4$, as shown in FIG. 5d and FIG. 6, the resonant current though the transformer $L_{lk}$ 219 starts to charge the drain source capacitance of the switching element $Q_2$ 216 towards half the input voltage $V_{in}/2$; and discharge the drain source capacitance of the switching element $Q_1$ 215 to zero. Before time $t_4$, the voltage 221' over the switching element $Q_1$ 215 will reach zero and its body diode will start conducting, thus clamping the switching element $Q_2$ 216 at half the input voltage $V_{in}/2$. At time $t_4$, the switching element $Q_1$ switches on, using zero voltage switching.

Between times $t_4$ and $t_5$, as shown in FIG. 5e and FIG. 6, the tank voltage $V_x$ 207' is equal to half the input voltage $V_{in}/2$. The voltage applied to the primary winding of the transformer 209 is the tank voltage $V_x$ 207' minus the voltage $V_{cp}$, the voltage across the primary resonant capacitance $C_p$ 208. The current 225' through $D_2$ 204 starts to decrease. At time $t_5$, the current 225" through the diode $D_2$ 204 is zero and so the diode $D_2$ 204 is blocked.

Between times $t_5$ and $t_6$, as shown in FIG. 5f and FIG. 6, the output is still charged by the secondary winding of the transformer 209 and the secondary resonant capacitance $C_s$ 220. At time to, the switching element $Q_1$ 215 is turned off, thus starting the dead-time period to ensure zero voltage switching operation.

Between times $t_6$ and $t_7$, as shown in FIG. 5g and FIG. 6, the resonant current though the transformer $L_{lk}$ 219 starts to charge the drain source capacitance of the switching element $Q_1$ 215 towards half the input voltage $V_{in}/2$; and discharge the drain source capacitance of the switching element $Q_2$ 216 to zero. Before time $t_7$, the voltage 222' over the switching element $Q_2$ 216 will reach zero, and its body diode will start conducting, thus clamping the switching element $Q_1$ 215 at half the input voltage $V_{in}/2$. At time t the switching element $Q_2$ 216 switches on using zero voltage switching.

The circuit state at time to shown in FIG. 5g is approximately equivalent to the circuit state at time $t_1$ as shown in FIG. 5a. The key difference is that the first pair of switching elements $Q_1$ 215 and $Q_2$ at time to are now in a state equivalent to the second pair of switching elements $Q_3$ and $Q_4$ at time $t_1$ and vice-versa. FIGS. 5h to 5k are hence analogous to FIGS. 5b to 5e and therefore will not be discussed in detail.

As explained above, the tank voltage $V_x$ 207' in FIG. 6, mode 1 operation, can be seen to be switching at twice the frequency as the tank voltage $V_x$ 207 in FIG. 4, mode 3 operation, and with half the amplitude. This is as a result of the first pair of switching elements $Q_1$ 215 and $Q_2$ 216 operating out of phase with the second pair of switching elements $Q_3$ 217 and $Q_4$ 218. The tank voltage $V_x$ 207' in mode 1 operation alternates between zero and half the input voltage $V_{in}/2$, rather than alternating between zero and the input voltage $V_{in}$ as per mode 1. If the input voltage were, however, to be split unequally between each pair of switches, the tank voltage $V_x$ 207' would instead alternate in a sequence between zero, the first voltage 203, zero and the second voltage 228.

Referring to FIGS. 7a to 7k and FIG. 8, a mode of operation of the three-level zeta asymmetrical half-bridge 200 of FIG. 2 is shown. The shaded elements in FIGS. 7a to 7k indicate no conduction. The mode of operation outlined in FIGS. 7a to 7k and FIG. 8 is referred to as mode 2. In FIGS. 7a to 7k, the input voltage $V_{in}$ 201 is split evenly between a first capacitor 206 and a second capacitor 230. The voltage of the capacitors 206, 230 corresponds to the input voltages $V_{in}/2$ 203, 228 of FIG. 2.

Figure 7A:
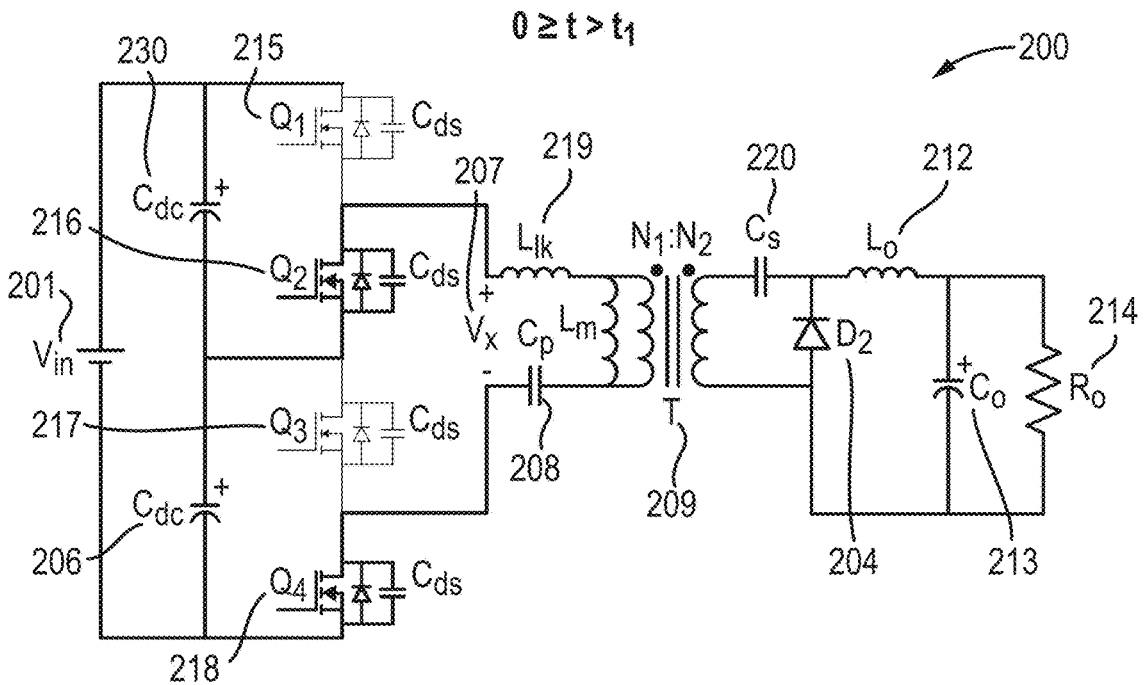
FIGS. 7a to 7k show different operating states of the three-level zeta asymmetrical half-bridge of FIG. 2 during mode 2 operation.
Figure 7B:
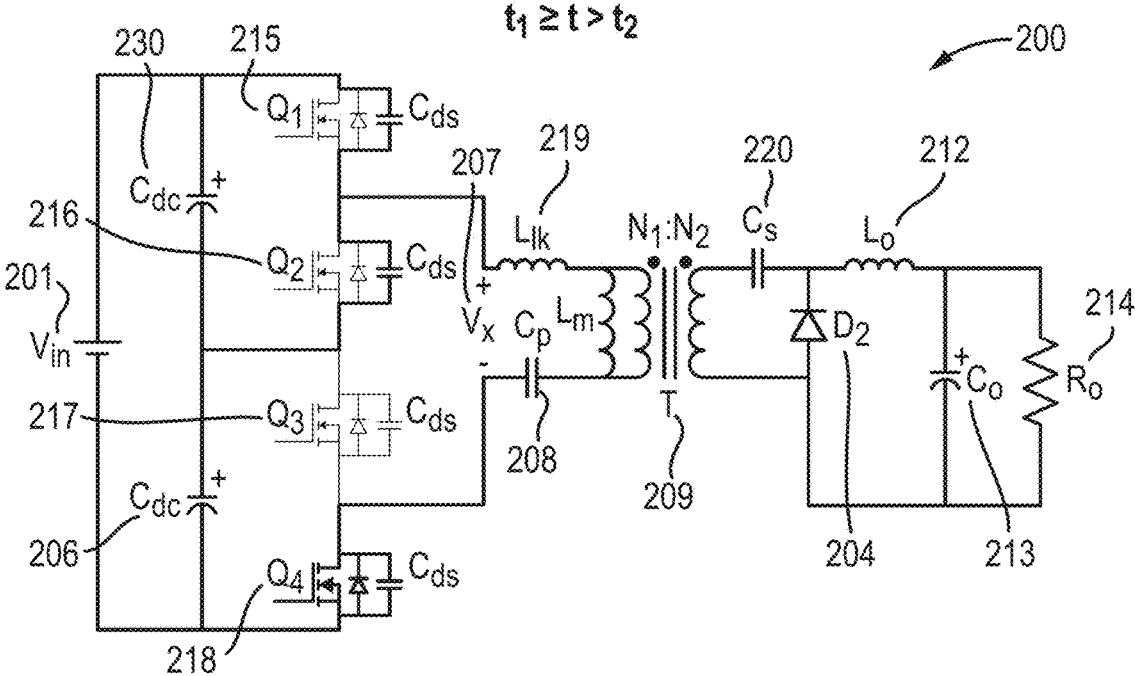
Figure 7C:
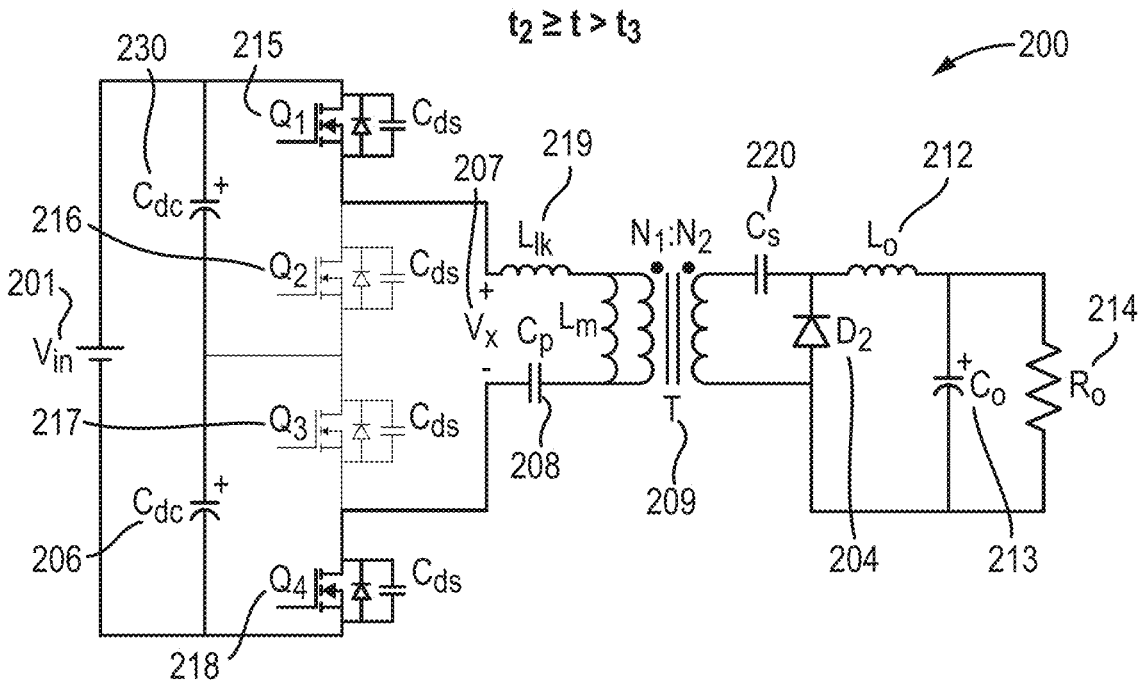
Figure 7D:
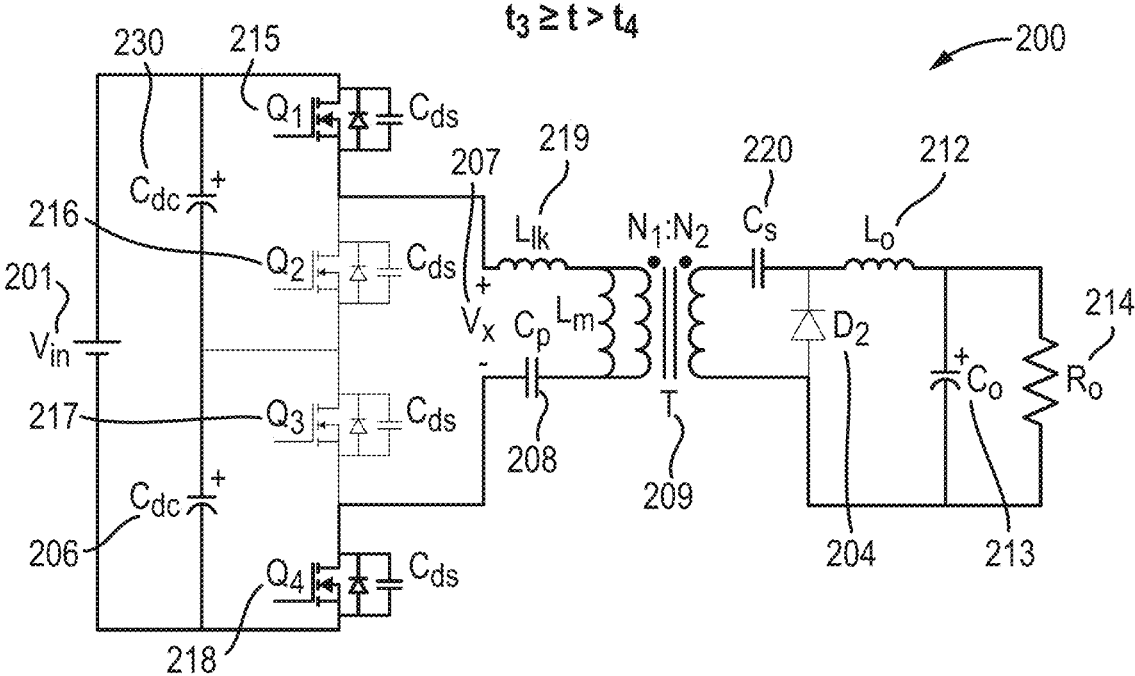
Figure 7E:
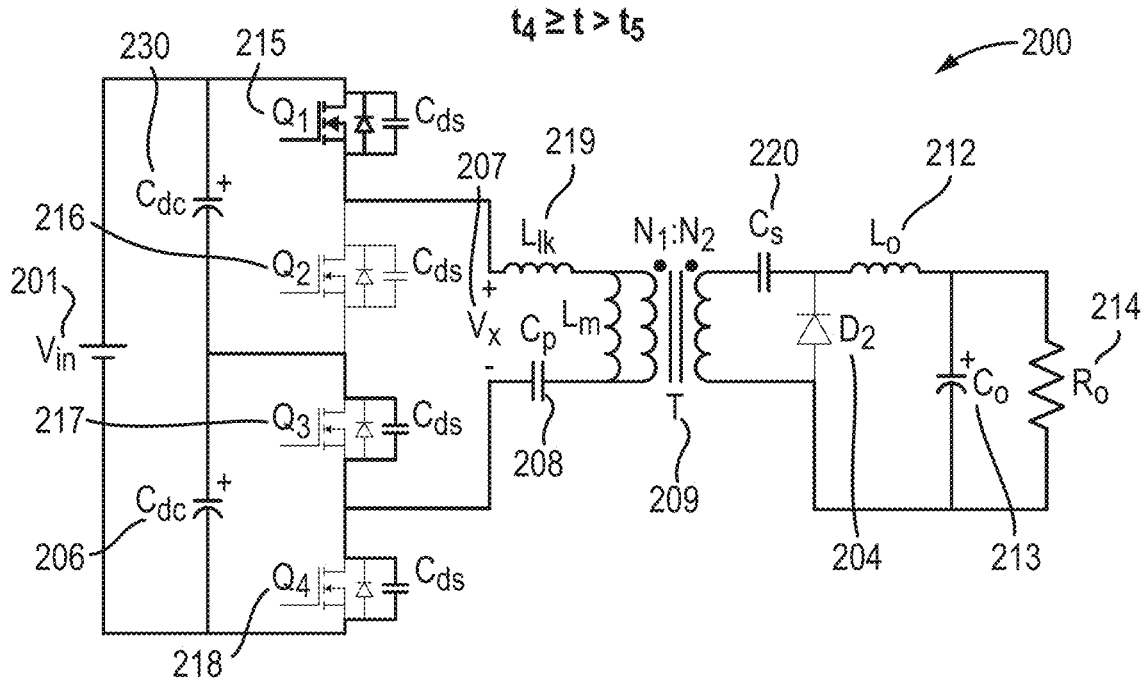
Figure 7F:
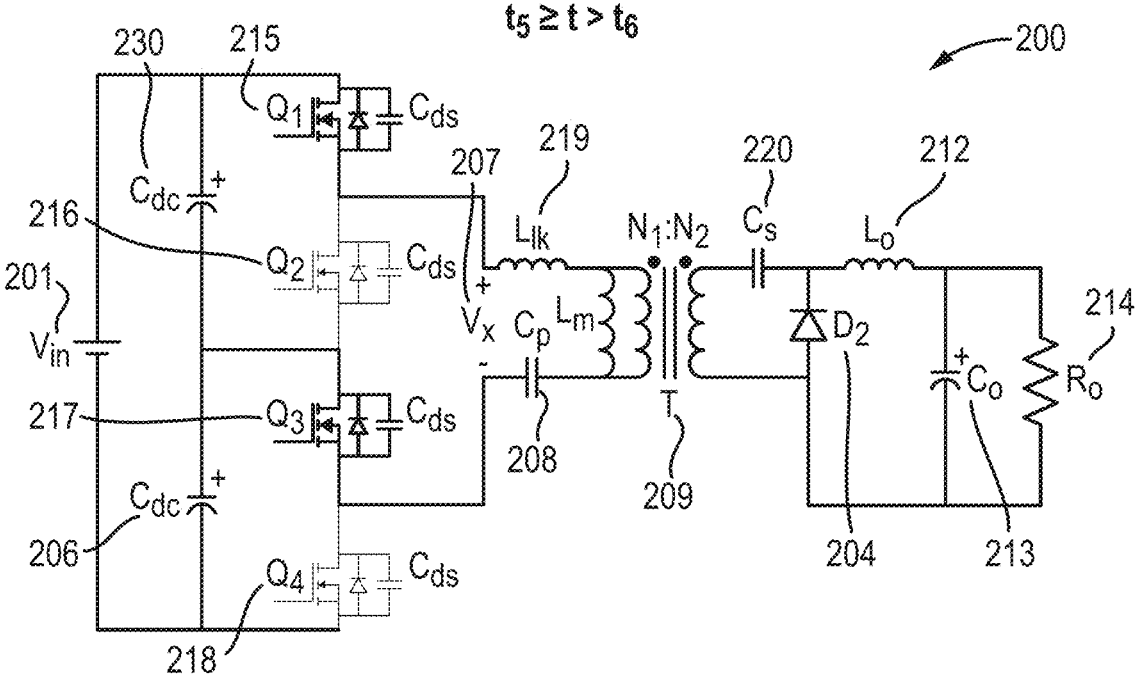
Figure 7G:
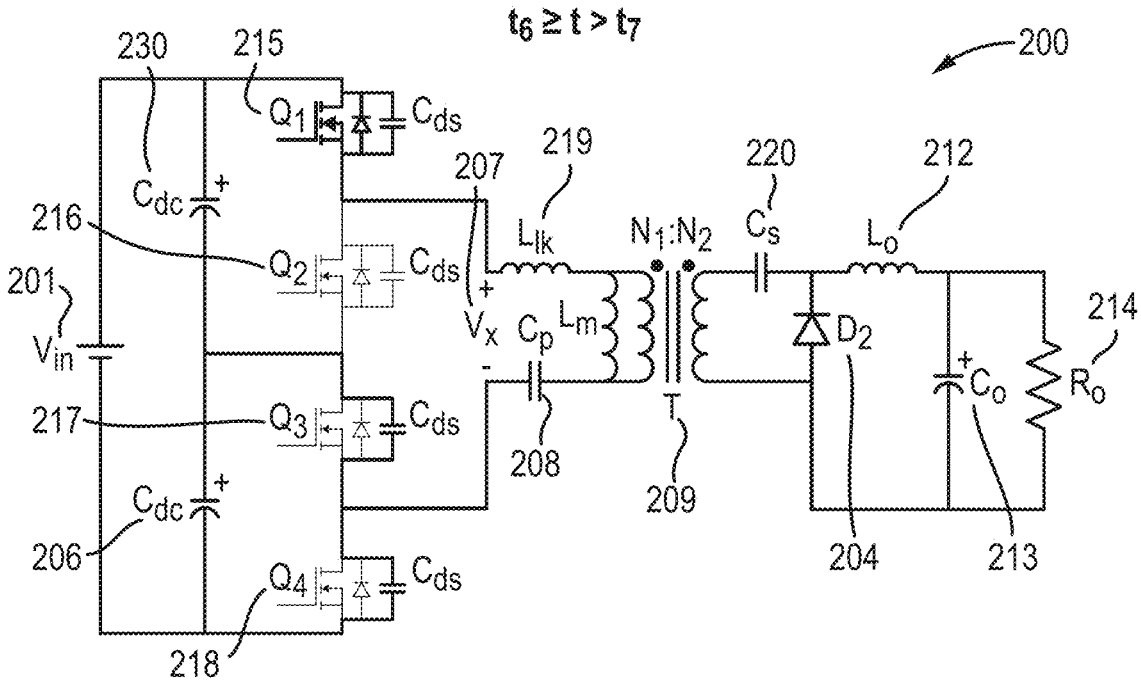
Figure 7H:
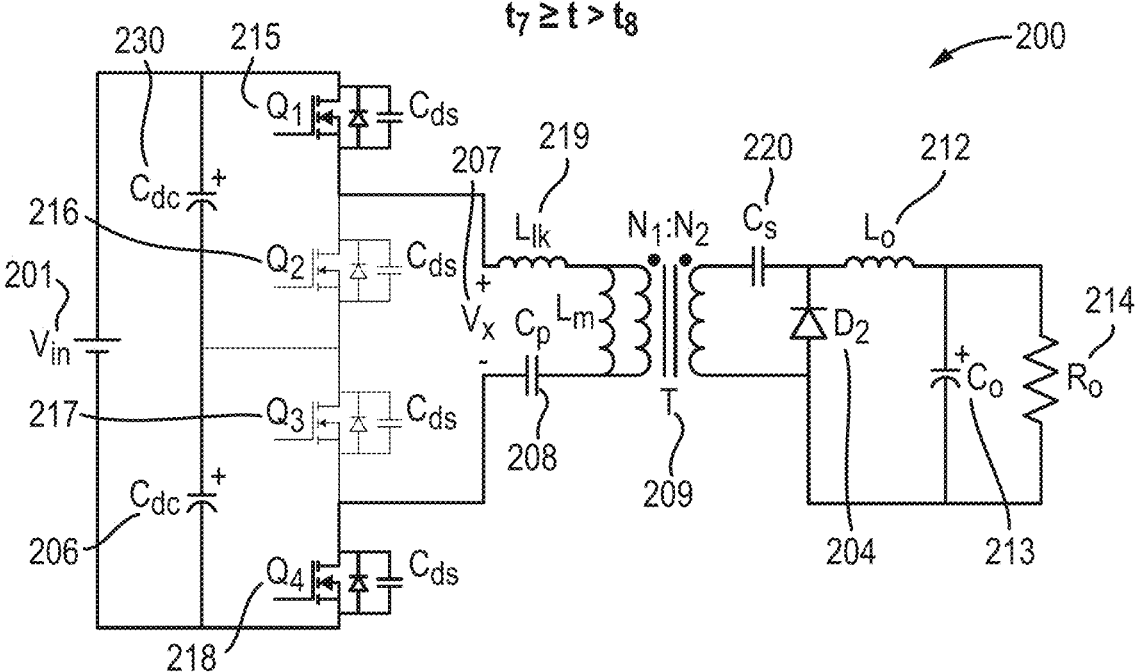
Figure 7I:
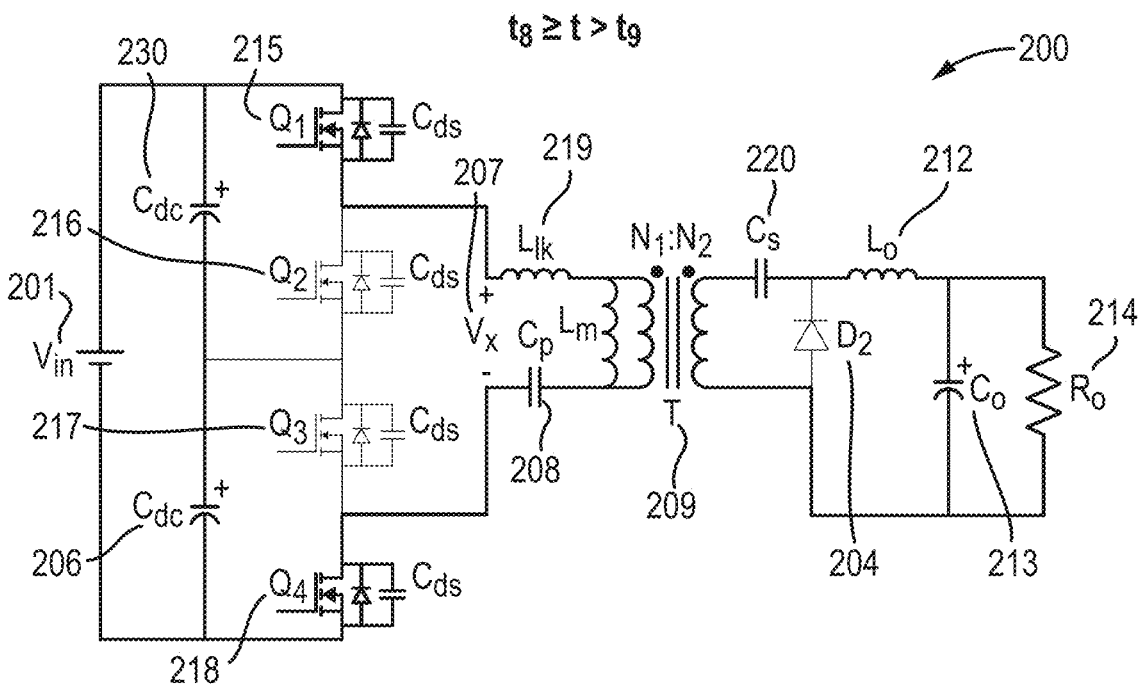
Figure 7J:
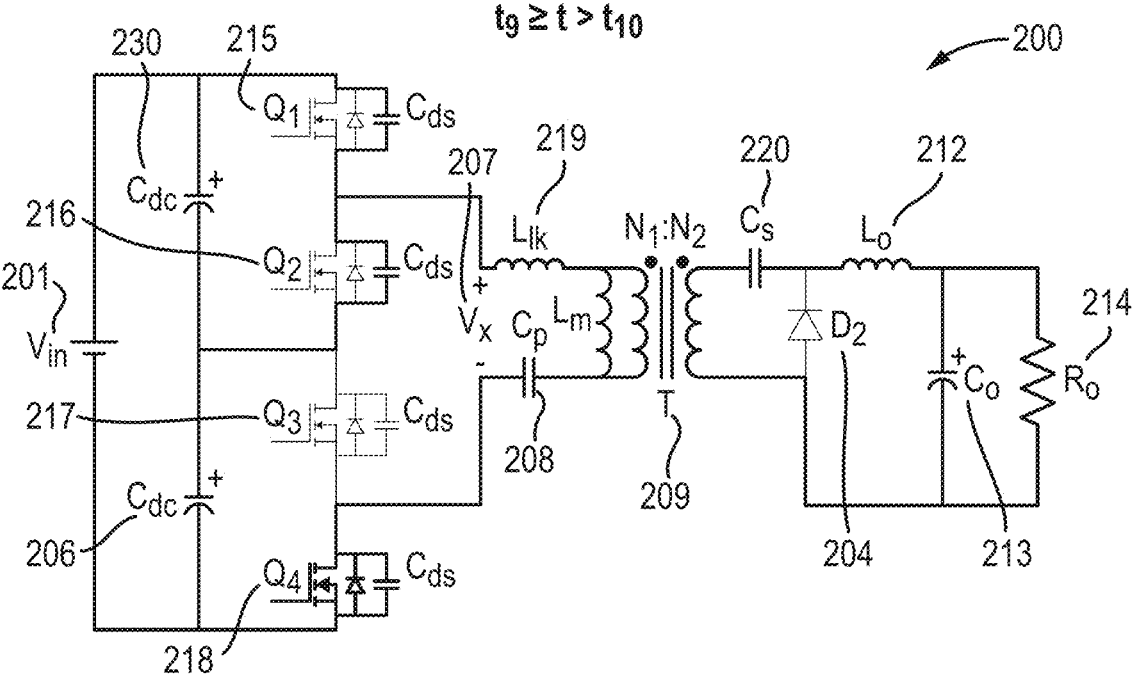
Figure 7K:
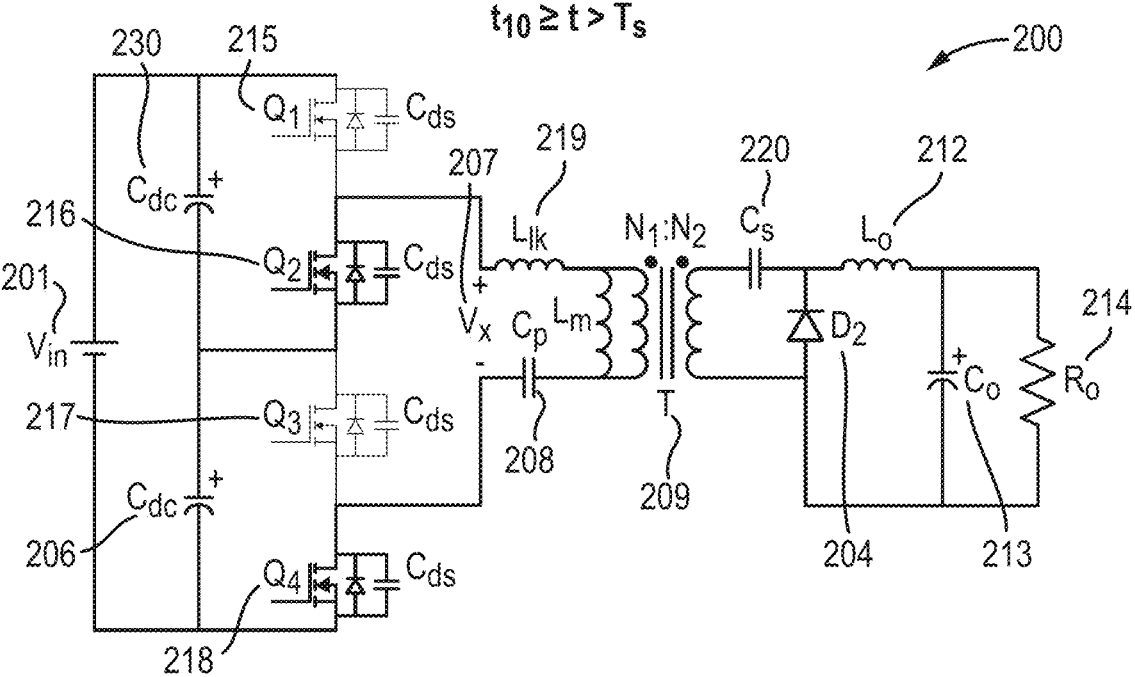
Figure 8:
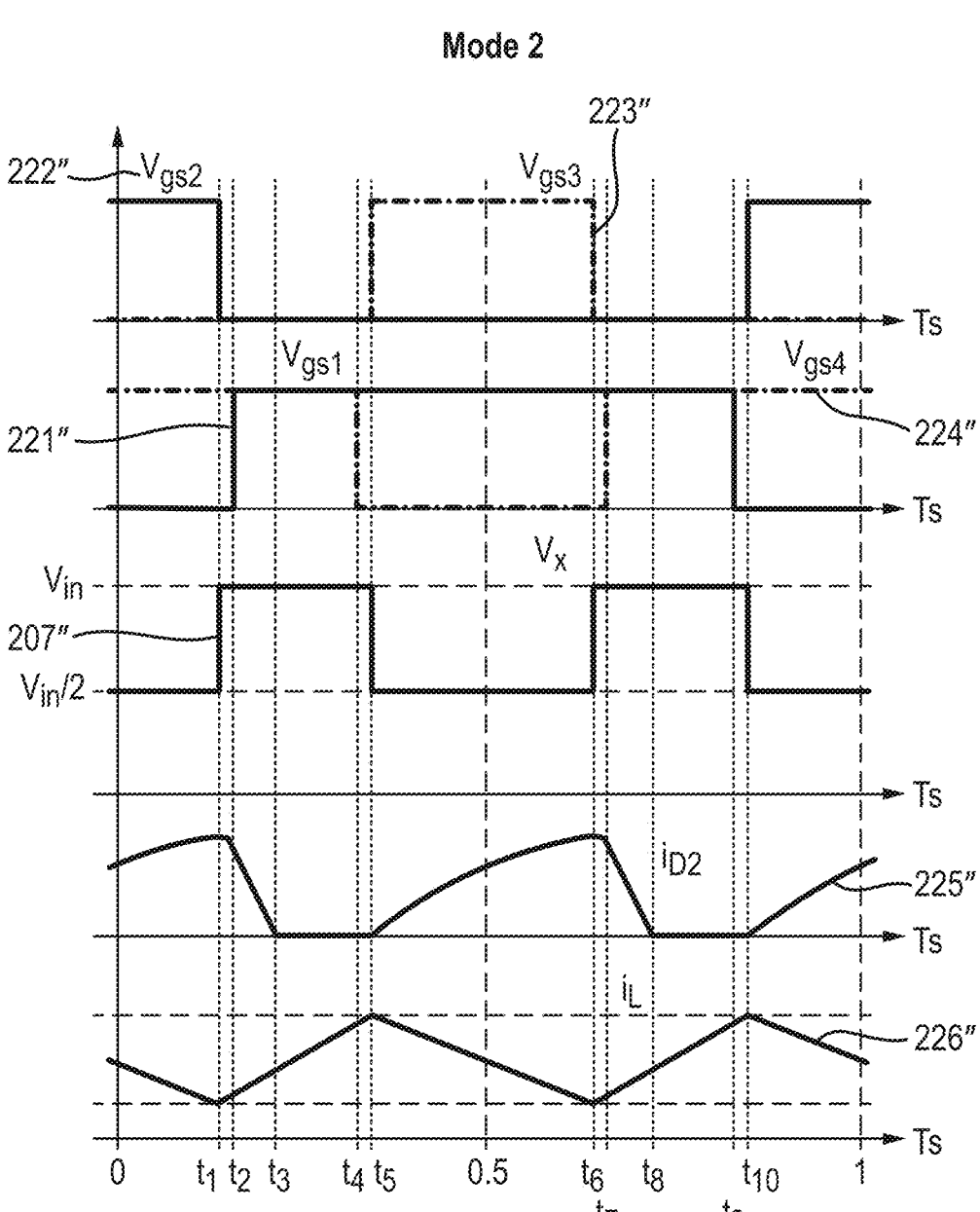
FIG. 8 shows waveforms of voltages and currents during the mode 2 operation of FIGS. 7a to 7k.

Referring to FIG. 8, waveforms are shown between times to and $T_s$ for mode 2 operation, as described in FIGS. 7a to 7k, of the three-level zeta asymmetrical half-bridge 200 of FIG. 2. The waveforms shown represent the gate-source voltage 221" of the switching element $Q_1$ 215; the gate-source voltage 222" of the switching element $Q_2$ 216; the gate-source voltage 223" of the switching element $Q_3$ 217; the gate-source voltage 224" of the switching element $Q_4$ 218; the tank voltage $V_x$ 207"; the current 225" through the diode $D_2$ 204; and the current 226" through the inductor $L_o$ 212. The current 226" is filtered by the capacitor $C_o$ 213 such that, ideally, a constant current is provided to the load $R_o$.

Between times to and $t_1$, as shown in FIG. 7a and FIG. 8, the tank voltage $V_x$ 207" is equal to half the input voltage $V_{in}/2$. The voltage applied to the primary winding of the transformer is the tank voltage $V_x$ 207" minus $V_{cp}$, the voltage across the primary resonant capacitance $C_p$ 208. The current 225" through the diode $D_2$ 204 increases as the inductor $L_o$ 212 and the capacitor $C_o$ 213 supply energy to the load $R_o$ 214. This time interval ends when the switching element $Q_2$ 216 is switched off at time $t_1$.

Between times $t_1$ and $t_2$, as shown in FIG. 7b and FIG. 8, the resonant current though the transformer $L_{lk}$ 219 starts to charge the drain source capacitance of the switching element $Q_2$ 216 towards half the input voltage $V_{in}/2$; and discharge the drain source capacitance of the switching element $Q_1$ 215 to zero. Before time $t_2$, the voltage 221" over the switching element $Q_1$ 215 will reach zero and its body diode will start conducting, thus clamping $Q_2$ 216 at half the input voltage $V_{in}/2$. At time $t_2$, the switching element $Q_1$ switches on, using zero voltage switching.

Between times $t_2$ and $t_3$, as shown in FIG. 7c and FIG. 8, the tank voltage $V_x$ 207" is equal to the input voltage $V_{in}$. The voltage applied to the primary winding of the transformer 209 is the tank voltage $V_x$ 207" minus the voltage $V_{cp}$, the voltage across the primary resonant capacitance $C_p$ 208. The current 225" through the diode $D_2$ 204 starts to decrease. At time $t_3$, the current 225" through the diode $D_2$ 204 is zero and so the diode $D_2$ 204 is blocked.

Between times $t_3$ and $t_4$, as shown in FIG. 7d and FIG. 8, the output is still charged by the secondary winding of the transformer 209 and the secondary resonant capacitance $C_s$ 220. At time $t_4$, the switching element $Q_4$ 215 is turned off, thus starting the dead-time period to ensure zero voltage switching operation.

Between times $t_4$ and $t_5$, as shown in FIG. 7e and FIG. 8, the resonant current though the transformer $L_{lk}$ 219 starts to charge the drain source capacitance of the switching element $Q_4$ 218 towards half the input voltage $V_{in}/2$; and discharge the drain source capacitance of $Q_3$ 217 to zero. Before time $t_5$, the voltage 223" over the switching element $Q_3$ 217 will reach zero, and its body diode will start conducting, thus clamping the switching element $Q_4$ 218 at half the input voltage $V_{in}/2$. At time $t_5$ the switching element $Q_3$ 217 switches on using zero voltage switching.

Between times $t_5$ and $t_6$, as shown in FIG. 7f and FIG. 8, the tank voltage $V_x$ 207" is equal to half the input voltage $V_{in}/2$. The voltage applied to the primary winding of the transformer is the tank voltage $V_x$ 207" minus $V_{cp}$, the voltage across the primary resonant capacitance $C_p$ 208. The current 225" through the diode $D_2$ 204 increases as the inductor $L_o$ 212 and the capacitor $C_o$ 213 supply energy to the load $R_o$ 214. This time interval ends when the switching element $Q_3$ 217 is switched off at time $t_6$.

Between times to and $t_7$, as shown in FIG. 7g and FIG. 8, the resonant current though the transformer $L_{lk}$ 219 starts to charge the drain source capacitance of the switching element $Q_3$ 217 towards half the input voltage $V_{in}/2$; and discharge the drain source capacitance of the switching element $Q_4$ 215 to zero. Before time $t_7$, the voltage 221" over the switching element $Q_4$ 218 will reach zero and its body diode will start conducting, thus clamping the switching element $Q_3$ 217 at half the input voltage $V_{in}/2$. At time $t_7$, the switching element $Q_4$ switches on, using zero voltage switching.

The circuit state at time to shown in FIG. 7g is approximately equivalent to the circuit state at time $t_1$ as shown in FIG. 7a. The key difference is that the first pair of switching elements $Q_1$ 215 and $Q_2$ at time to are now in a state equivalent to the second pair of switching elements $Q_3$ and $Q_4$ at time $t_1$ and vice-versa. FIGS. 7h to 7k are hence analogous to FIGS. 7b to 7e and therefore will not be discussed in detail.

Mode 2 operation is similar to mode 1 operation, however the tank voltage $V_x$ 207" in FIG. 8, mode 2 operation, can be seen to be switching between half the input voltage $V_{in}/2$ and the input voltage $V_{in}$, rather than between zero and half the input voltage $V_{in}/2$. The phase shift between the first pair of switching elements, $Q_1$ 215 and $Q_2$ 216, and the second pair of switching elements, $Q_3$ 217 and $Q_4$ 218, is different from the phase shift in mode 1 operation.

The best example of this can be seen by comparing FIGS. 5c and 6 with FIGS. 7c and 8. At time $t_2$, approximately zero voltage is applied to the resonant tank 211 during mode 1 operation in FIGS. 5c and 6. This is because the switching elements $Q_2$ 216 and $Q_3$ 217 are on at the same time. This respectively clamps the switching elements $Q_1$ 215 and $Q_4$ 218 to half the input voltage $V_{in}/2$ and therefore no voltage is applied to the resonant tank 211. The inverse happens at time $t_2$ in FIGS. 7c and 8, resulting in the input voltage $V_{in}$ being applied to the resonant tank 211. Due to the respective phase shifts, the switching elements $Q_1$ 215 and $Q_4$ 218 will never be on at the same time during mode 1 operation, and the switching elements $Q_2$ 216 and $Q_3$ 217 will never be on at the same time during mode 2 operation.

The tank voltage $V_x$ 207" in mode 2 operation alternates between half the input voltage $V_{in}/2$ and the input voltage $V_{in}$ in this example. However, if the input voltage were split unequally between each pair of switches, the tank voltage $V_x$ 207" would instead alternate in a sequence between the first voltage 203, the input voltage $V_{in}$, the second voltage 228, and the input voltage $V_{in}$.

Figure 9A:
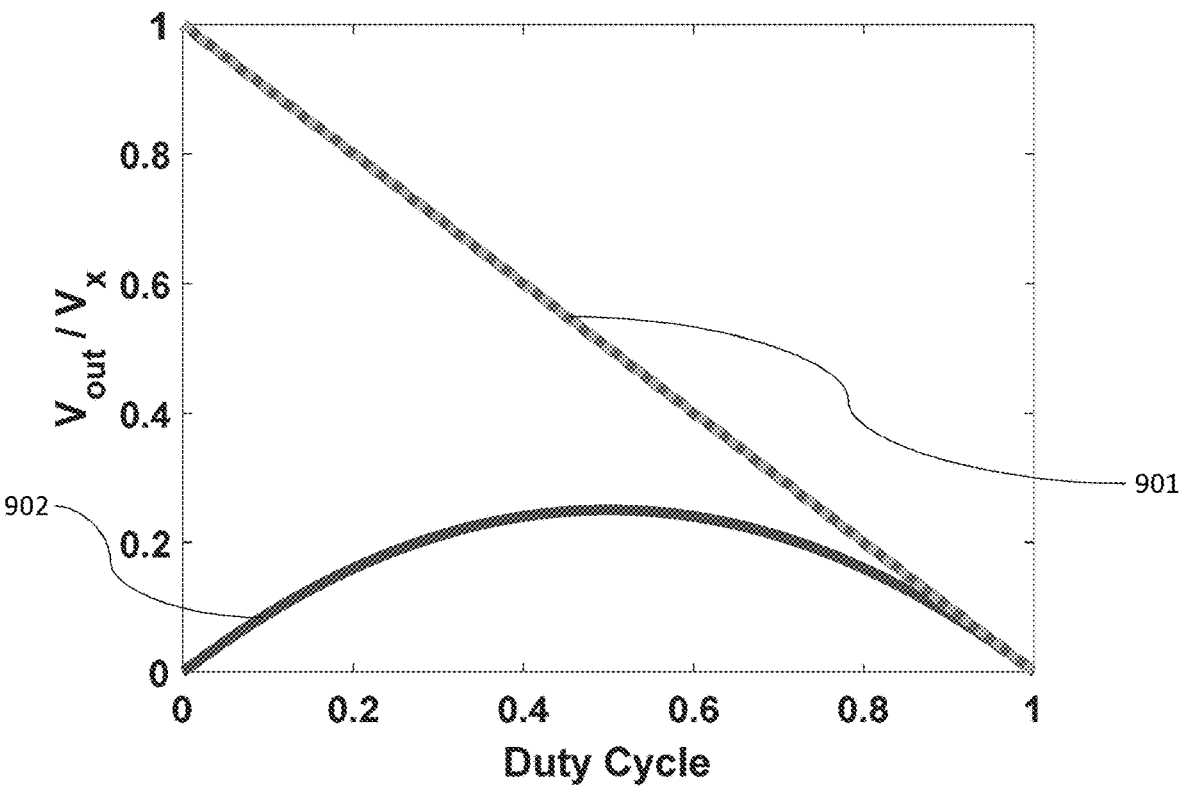
FIG. 9a shows the relationship between duty cycle and tank voltage to output voltage gain for each of a traditional asymmetrical half-bridge, a two-level zeta asymmetrical half-bridge and a three-level zeta asymmetrical half-bridge, each using a 1:1 transformer and operating at a given switching frequency of the switching elements.

Referring to FIG. 9a, the relationship between tank to output voltage gain and duty cycle 901 is shown for a two-level zeta asymmetrical half-bridge 100 or a three-level zeta asymmetrical half-bridge 200, this relationship is the same for both circuits. Also shown is the relationship between tank to output voltage gain and duty cycle 902 for a traditional asymmetrical half-bridge.

Figure 9B:
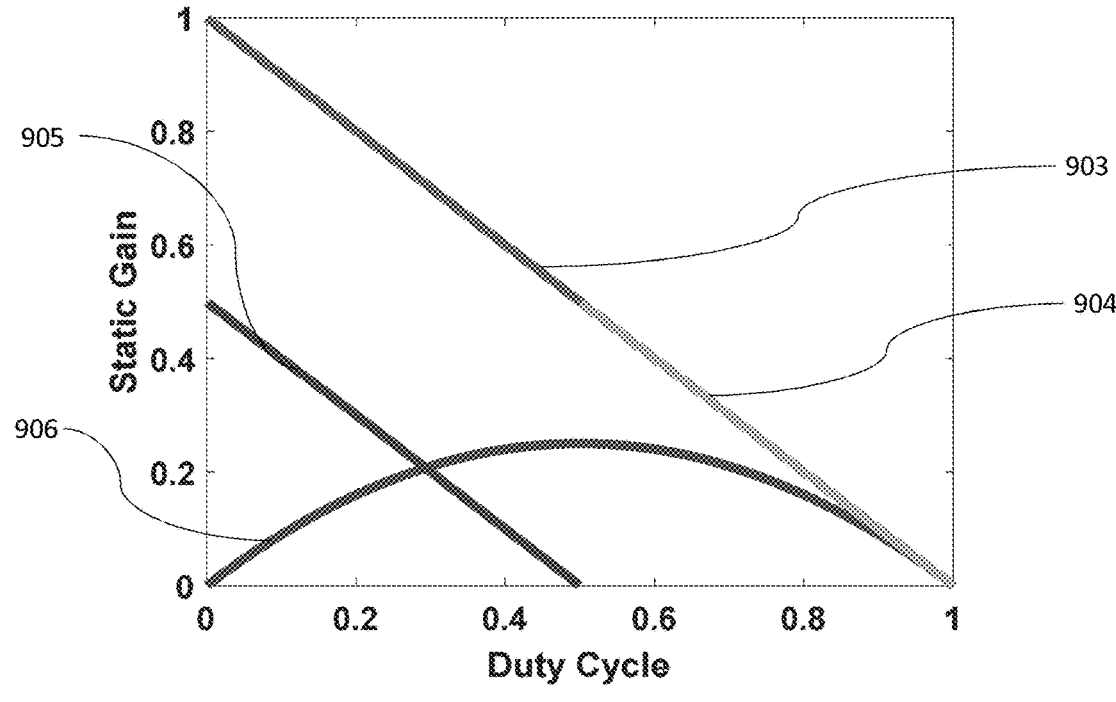
FIG. 9b shows the relationship between duty cycle and static gain for each of a traditional asymmetrical half-bridge, a two-level zeta asymmetrical half-bridge and a three-level zeta asymmetrical half-bridge, each using a 1:1 transformer and operating at a given switching frequency of the switching elements.

Referring to FIG. 9b, the relationship between static gain and duty cycle 905 is shown for a three-level asymmetrical half-bridge 200 in mode 2 operation, which is a linear relationship as the duty cycle is varied between 0 and 0.5. Also shown is the relationship between static gain and duty cycle 904 for a three-level asymmetrical half-bridge 200 in mode 1, which is a linear relationship as the duty cycle is varied between 0.5 and 1. Also shown is the relationship between static gain and duty cycle 903 for a three-level asymmetrical half-bridge 200 in mode 3 operation, which is the same as for a two-level asymmetrical half-bridge 100, this is a linear relationship as the duty cycle is varied between 0 and 1. When the duty cycle is below 0.5, the static gain 903 of a three-level zeta asymmetrical half bridge 200 in mode 3 operation, or a two-level zeta asymmetrical half-bridge 100, is higher than the static gain 905 of a three-level zeta asymmetrical half bridge 200 in mode 2 operation. When the duty cycle is above 0.5, the static gain 903 of a three-level zeta-asymmetrical half bridge in mode 3 operation, or a two-level zeta asymmetrical half-bridge 100, is the same as the static gain 904 of a three-level zeta asymmetrical half bridge 200 in mode 1 operation; hence 903 overlaps with 904 along the length of 904 in FIG. 9b. Finally, the relationship between static gain and duty cycle 906 is shown for a traditional asymmetrical half-bridge.

Referring to FIGS. 9a and 9b, it can be seen that both the two-level zeta asymmetrical half-bridge 100 and the three-level zeta asymmetrical half-bridge 200 have a linear relationship between duty cycle and tank to output voltage gain 901; and a linear relationship between duty cycle and static gain 903, 904, 905. Whereas the tank to output voltage gain 902 and the static gain 906 of a traditional asymmetrical half-bridge operating at the same switching frequency has a non-linear, quadratic, relationship with duty cycle. This provides various benefits in the control of a zeta asymmetrical half-bridge over a traditional asymmetrical half-bridge, as the linear relationship is much simpler to account for than the non-linear relationship.

Additionally, FIG. 9b shows that the static gain 903, 904, 905 of a three-level zeta asymmetrical half-bridge 200 is different depending on which of the 3 modes of operation that the device operates in. This provides greater flexibility in the configuration of the device when compared with a two-level zeta asymmetrical half-bridge 100.

FIG. 9b shows that for a given 1:1 transformer, and a given switching frequency of the switching elements, modes 1 and 2 will have a linear gain 904, 905 between zero and 0.5. This may be lower than the gain 903 during mode 3 operation, which is the same as the gain 903 of an equivalent two-level zeta asymmetrical half-bridge 100, which is between zero and 1. This again highlights the advantage that operation of a three-level zeta asymmetrical half-bridge 200 in modes 1 and 2 in step down applications requires a smaller transformer than an equivalent two-level zeta asymmetrical half-bridge 100, and/or may operate with a lower switching frequency, due to the lower linear gain 904, 905.

Figure 10A:
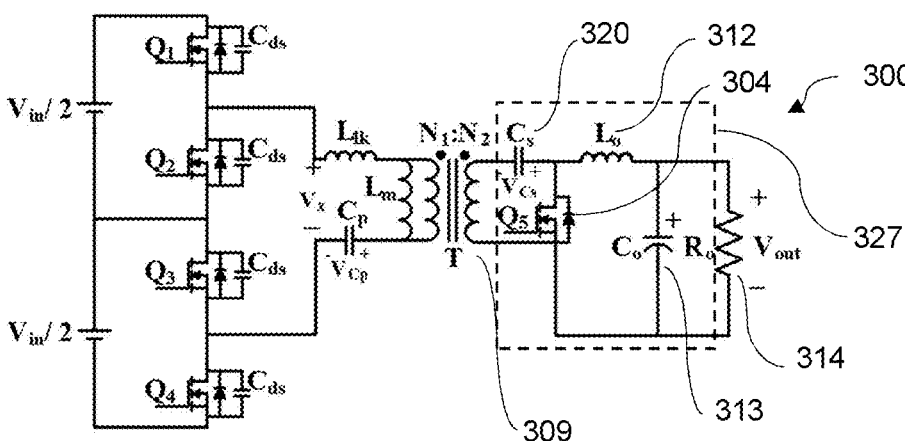
FIG. 10a shows a three-level zeta asymmetrical half-bridge according to the present disclosure, with active rectification.

Referring to FIG. 10a, a variant 300 of the three-level zeta asymmetrical half-bridge 200 of FIG. 2 is shown, wherein the diode $D_2$ 204 is replaced with a rectifying switching element $Q_5$ 304, which in this example is a MOSFET, for active rectification; as opposed to the passive rectification used in the three-level zeta asymmetrical half bridge 200. This is an example of a variation of the zeta converter 227 used in the three-level zeta asymmetrical half-bridge 200 of FIG. 2. Active rectification has lower conduction losses than passive rectification, this is particularly useful for applications with a high current load, which often correspond with low voltage applications.

In this example, the zeta converter 327 comprises: a MOSFET $Q_5$ 304 in series with the secondary winding of the transformer 309; an output inductor $L_o$ 312 in series with a secondary resonant capacitance $C_s$ 320, and in parallel with MOSFET $Q_5$ 304. The zeta converter 327 further comprises an output capacitor $C_O$ 313 in series with the output inductor $L_O$ 312. In this example, the DC output voltage $V_{out}$ 314 is applied to a load $R_O$ 314 in parallel with the output capacitor $C_O$ 313 and in series with the output inductor $L_O$ 312.

Figure 10B:
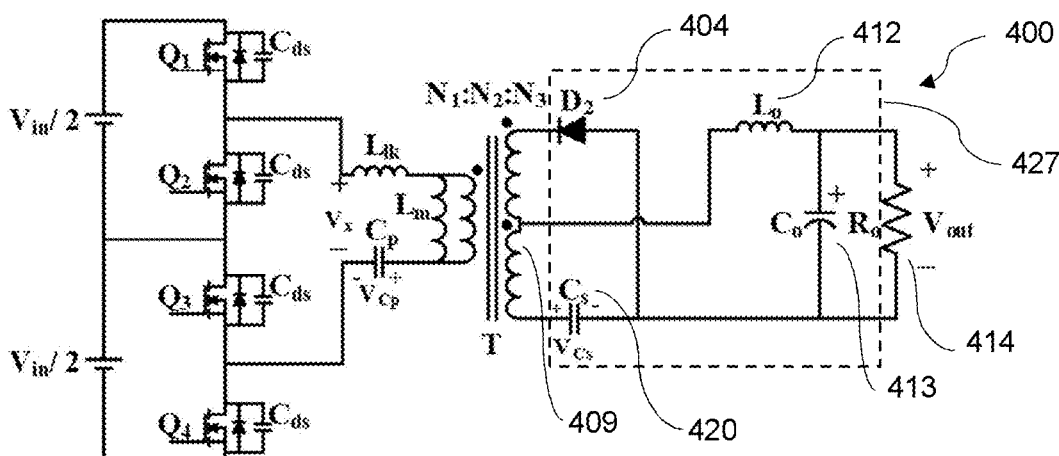
FIG. 10b shows a three-level zeta asymmetrical half-bridge according to the present disclosure, with a tapped-transformer.

Referring to FIG. 10b, another variant 400 of the three-level zeta asymmetrical half-bridge 200 of FIG. 2 is shown with a tapped transformer 409. This is another example of a variation of the zeta converter 227 used in the three-level zeta asymmetrical half-bridge 200 of FIG. 2. A Tapped transformer gives an extra degree of freedom to optimize the secondary side conduction of the secondary resonant capacitance $C_s$ 420 and the diode $D_2$ 404 towards loss and/or size reduction. This is achieved by varying the ratio of turns between each of the output windings of the tapped transformer 409.

In this example, the zeta (427) converter comprises: a rectifying diode $D_2$ 404 in series with the secondary winding of the tapped transformer 409; an output inductor $L_O$ 412 connected part-way along the secondary winding of the transformer 409; and an output capacitor $C_O$ 413 in series with the output inductor $L_O$ 412. In this example, the DC output voltage $V_{out}$ 414 is applied to a load $R_O$ 414 in parallel with the output capacitor $C_O$ 413 and in series with the output inductor $L_O$ 412. In this example, the zeta converter 427 further comprises a secondary resonant capacitance $C_S$ 420 in series with each of the secondary winding of the transformer 409, the rectifying diode $D_2$ 404, and the output inductor $L_O$ 412.

Figure 10C:
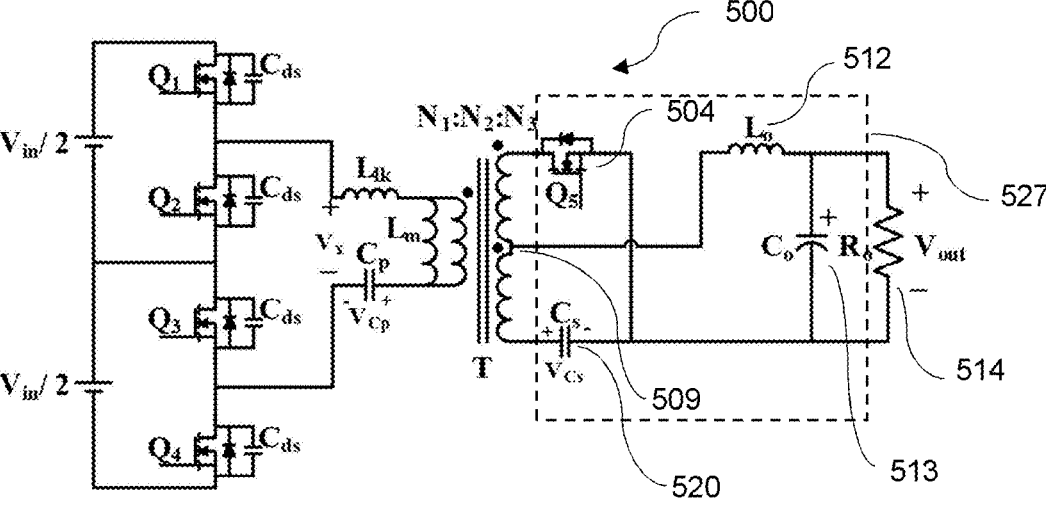
FIG. 10c shows a three-level zeta asymmetrical half-bridge according to the present disclosure, with active rectification and a tapped transformer.

Referring to FIG. 10c, a further variant 500 of the three-level zeta asymmetrical half-bridge 200 of FIG. 2 is shown which has both a rectifying switching element $Q_5$ 504, which in this example is a MOSFET, for active rectification, and a tapped transformer 509. This is a further example of a variation of the zeta converter 227 used in the three-level zeta asymmetrical half-bridge 200 of FIG. 2 and has the advantages of both the active rectification and trapped transformed topologies.

In this example, the zeta converter 527 comprises: a MOSFET $Q_5$ 504 in series with the secondary winding of the tapped transformer 509; an output inductor $L_O$ 512 connected part-way along the secondary winding of the transformer 509; an output capacitor $C_O$ 513 in series with the output inductor $L_O$ 512. In this example, the DC output voltage $V_{out}$ 514 is applied to a load $R_O$ 514 in parallel with the output capacitor $C_O$ 513 and in series with the output inductor $L_O$ 512. In this example, the zeta converter 527 further comprises a secondary resonant capacitance $C_S$ 520 in series with each of the secondary winding of the transformer 509, the MOSFET $Q_5$ 504, and the output inductor $L_O$ 512. One skilled in the art will appreciate that the three-level zeta asymmetrical half-bridge 200; 300; 400; 500 may be useful for step down DC voltage conversion applications due to the benefits listed above, for example the reduction in the size of the transformer and/or the reduction in switching frequency relative to an equivalent two-level zeta-asymmetrical half-bridge. In addition, by splitting the input voltage 201 into a first input voltage 203 and a second input voltage 228, therefore reducing the size of the voltage applied to the components of the circuit, higher input voltages may be applied to the circuit and/or smaller components may be used. In particular, the three-level zeta asymmetrical half-bridge 200; 300; 400; 500 is useful in stepping down voltages in the region of 400V to 3 kV to a voltage of approximately 28V. Therefore, a three-level zeta asymmetrical half-bridge 200; 300; 400; 500 would be particularly useful in aircrafts where DC power distribution is used. Here, the high voltages may be used in the aircraft's propulsion systems, while the lower voltages may be used elsewhere in the aircraft. Galvanic isolation between the high voltage load is particularly important to ensure proper grounding protection and safety.

The three-level zeta asymmetrical half-bridge 200; 300; 400; 500 may also be useful when the high input voltage has a wide variation, for example a variation between 400v to 750V, as the three-level zeta asymmetrical half-bridge 200; 300; 400; 500 will be able to operate at a fixed switching frequency, despite the high voltage variation by changing the duty cycle. This presents an advantage over a traditional LLC converter for this application which would require a high variation of switching frequency.

The invention claimed is:

1. A three-level zeta asymmetrical half-bridge for converting a direct current (DC) input voltage into a DC output voltage comprising:
   an asymmetrical half-bridge comprising a first pair of switching elements and a second pair of switching elements in series with the first pair of switching elements;
   a resonant tank in parallel with one switching element from each pair of switching elements, the resonant tank comprising a magnetizing inductance of a primary winding of a transformer, a resonant inductance, and a primary resonant capacitance; and
   a zeta converter connected to a secondary winding of the transformer;
   wherein the three-level zeta asymmetrical half-bridge is configured to apply a first portion of the DC input voltage in parallel with the first pair of switching elements and to apply a second portion of the DC input voltage in parallel with the second pair of switching elements;
   wherein each pair of switching elements is configured to operate in a sequence to selectively connect and disconnect the resonant tank to and from the respective first or second portion of the DC input voltage such that a voltage applied to the resonant tank alternates between a lower voltage and a higher voltage;
   wherein the resonant tank is configured to filter out a DC component of the voltage applied to the resonant tank and output a filtered resonant tank voltage to the primary winding of the transformer;
   wherein the first pair of switching elements and the second pair of switching elements are configured to operate in different modes so as to:
      in a first mode, alternate the voltage applied to the resonant tank between half the DC input voltage and ground; and
      in a second mode, alternate the voltage applied to the resonant tank between the DC input voltage and half the DC input voltage; and
   wherein the zeta converter is configured to rectify an output of the secondary winding of the transformer to generate the DC output voltage.

2. The three-level zeta asymmetrical half-bridge of claim 1, wherein each of the switching elements comprises a switch, a diode, and a capacitance in parallel.

3. The three-level zeta asymmetrical half-bridge of claim 2, wherein each of the switching elements is configured to switch on when a voltage across the respective switching element is zero.

4. The three-level zeta asymmetrical half-bridge of claim 1, wherein the zeta converter comprises:
   a secondary resonant capacitance in series with the secondary winding of the transformer;
   a rectifying diode in series with the secondary winding of the transformer;
   an output inductor in series with the secondary resonant capacitance and in parallel with the rectifying diode; and
   an output capacitor in series with the output inductor; and wherein the three-level zeta asymmetrical half-bridge is configured to apply the DC output voltage to a load in parallel with the output capacitor and in series with the output inductor.

5. The three-level zeta asymmetrical half-bridge of claim 1, wherein the zeta converter comprises:

a rectifying switching element comprising a switch and a diode in parallel, wherein the rectifying switching element is in series with the secondary winding of the transformer;

an output inductor in parallel with the rectifying switching element; and an output capacitor in series with the output inductor; and wherein the three-level zeta asymmetrical half-bridge is configured to apply the DC output voltage to a load in parallel with the output capacitor and in series with the output inductor.

6. The three-level zeta asymmetrical half-bridge of claim 5, wherein the rectifying switching element is a metal-oxide semiconductor field effect transistor (MOSFET) with an integrated body diode and switch.

7. The three-level zeta asymmetrical half-bridge of claim 1, wherein:

the transformer is a tapped transformer;

the zeta converter comprises:

a rectifying diode in series with the secondary winding of the transformer;

an output inductor connected part-way along the secondary winding of the transformer; and an output capacitor in series with the output inductor;

the three-level zeta asymmetrical half-bridge is configured to apply the DC output voltage to a load in parallel with the output capacitor and in series with the output inductor; and the zeta converter further comprises a secondary resonant capacitance in series with each of the secondary winding of the transformer, the rectifying diode, and the output inductor.

8. The three-level zeta asymmetrical half-bridge of claim 1, wherein:

the transformer is a tapped transformer;

the zeta converter comprises:

a rectifying switching element comprising a switch and a diode in parallel, wherein the rectifying switching element is in series with the secondary winding of the transformer;

an output inductor connected part-way along the secondary winding of the transformer; and an output capacitor in series with the output inductor;

the three-level zeta asymmetrical half-bridge is configured to apply the DC output voltage to a load in parallel with the output capacitor and in series with the output inductor; and the zeta converter further comprises a secondary resonant capacitance in series with each of the secondary winding of the transformer, the rectifying switching element, and the output inductor.

9. The three-level zeta asymmetrical half-bridge of claim 8, wherein the rectifying switching element is a metal-oxide semiconductor field effect transistor (MOSFET) with an integrated body diode and switch.

10. The three-level zeta asymmetrical half-bridge of claim 1, wherein the resonant inductance is a leakage inductance of the primary winding of the transformer.

11. The three-level zeta asymmetrical half-bridge of claim 1, wherein the switching elements are configured to alternate the voltage applied to the resonant tank between the lower voltage and the higher voltage at a fixed frequency.

12. The three-level zeta asymmetrical half-bridge of claim 11, wherein a proportion of time that the voltage applied to the resonant tank is the higher voltage is varied.

13. The three-level zeta asymmetrical half-bridge of claim 1, wherein the switching elements are configured to operate to generate a square wave to the resonant tank such that the voltage applied to the resonant tank is a square wave.

14. The three-level zeta asymmetrical half-bridge of claim 1, wherein:

the DC input voltage is split across a first capacitor, across which the first portion of the DC input voltage is applied, and a second capacitor, across which the second portion of the DC input voltage is applied; and the first capacitor is in series with the second capacitor.

15. A method of operating a three-level zeta asymmetrical half-bridge to convert a direct current (DC) input voltage into a DC output voltage, wherein the three-level zeta asymmetrical half-bridge comprises:

an asymmetrical half-bridge comprising a first pair of switching elements and a second pair of switching elements in series with the first pair of switching elements;

a resonant tank in parallel with one switching element from each pair of switching elements, the resonant tank comprising a magnetizing inductance of a primary winding of a transformer, a resonant inductance, and a primary resonant capacitance; and a zeta converter connected to a secondary winding of the transformer;

the method comprising:

applying a first portion of the DC input voltage in parallel with the first pair of switching elements;

applying a second portion of the DC input voltage in parallel with the second pair of switching elements;

operating each pair of switching elements in a sequence to selectively connect and disconnect the resonant tank to and from the respective first or second portion of the DC input voltage such that a voltage applied to the resonant tank alternates between a lower voltage and a higher voltage;

using the resonant tank, filtering out a DC component of the voltage applied to the resonant tank and outputting a filtered resonant tank voltage to the primary winding of the transformer; and using the zeta converter, rectifying an output of the secondary winding of the transformer to generate the DC output voltage;

wherein the first pair of switching elements and the second pair of switching elements operate in different modes so as to:

in a first mode, alternate the voltage applied to the resonant tank between half the DC input voltage and ground; and in a second mode, alternate the voltage applied to the resonant tank between the DC input voltage and half the DC input voltage.

16. The method of claim 15, wherein the zeta converter comprises:

a secondary resonant capacitance in series with the secondary winding of the transformer;

a rectifying diode in series with the secondary winding of the transformer;

an output inductor in series with the secondary resonant capacitance and in parallel with the rectifying diode; and an output capacitor in series with the output inductor; and wherein the three-level zeta asymmetrical half-bridge applies the DC output voltage to a load in parallel with the output capacitor and in series with the output inductor.

17. The method of claim 15, wherein the zeta converter comprises:

a rectifying switching element comprising a switch and a diode in parallel, wherein the rectifying switching element is in series with the secondary winding of the transformer;

an output inductor in parallel with the rectifying switching element; and an output capacitor in series with the output inductor; and wherein the three-level zeta asymmetrical half-bridge applies the DC output voltage to a load in parallel with the output capacitor and in series with the output inductor.

18. The method of claim 15, wherein:

the transformer is a tapped transformer;

the zeta converter comprises:

a rectifying diode in series with the secondary winding of the transformer;

an output inductor connected part-way along the secondary winding of the transformer; and an output capacitor in series with the output inductor;

the three-level zeta asymmetrical half-bridge applies the DC output voltage to a load in parallel with the output capacitor and in series with the output inductor; and the zeta converter further comprises a secondary resonant capacitance in series with each of the secondary winding of the transformer, the rectifying diode, and the output inductor.

19. The method of claim 15, wherein:

the transformer is a tapped transformer;

the zeta converter comprises:

a rectifying switching element comprising a switch and a diode in parallel, wherein the rectifying switching element is in series with the secondary winding of the transformer;

an output inductor connected part-way along the secondary winding of the transformer; and an output capacitor in series with the output inductor;

the three-level zeta asymmetrical half-bridge applies the DC output voltage to a load in parallel with the output capacitor and in series with the output inductor; and the zeta converter further comprises a secondary resonant capacitance in series with each of the secondary winding of the transformer, the rectifying switching element, and the output inductor.

20. The method of claim 15, wherein the voltage applied to the resonant tank is a square wave.

\* \* \* \* \*